(12) United States Patent
Arai et al.

(10) Patent No.: US 12,283,761 B2
(45) Date of Patent: Apr. 22, 2025

(54) ANTENNA MODULE AND COMMUNICATION DEVICE INCLUDING THE SAME

(71) Applicant: Murata Manufacturing Co., Ltd., Nagaokakyo (JP)

(72) Inventors: Kota Arai, Nagaokakyo (JP); Ryo Komura, Nagaokakyo (JP); Kaoru Sudo, Nagaokakyo (JP); Hisao Hayafuji, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 287 days.

(21) Appl. No.: 17/939,956

(22) Filed: Sep. 8, 2022

(65) Prior Publication Data
US 2023/0006350 A1 Jan. 5, 2023

Related U.S. Application Data

(63) Continuation of application No. PCT/JP2021/005805, filed on Feb. 17, 2021.

(51) Int. Cl.
*H01Q 5/378* (2015.01)
*H01Q 1/22* (2006.01)
*H01Q 1/38* (2006.01)

(52) U.S. Cl.
CPC .......... *H01Q 5/378* (2015.01); *H01Q 1/2283* (2013.01); *H01Q 1/38* (2013.01)

(58) Field of Classification Search
CPC ..... H04L 5/001; H04L 5/0098; H04L 5/1469; H04W 52/0206; H04W 52/0235;
(Continued)

(56) References Cited

U.S. PATENT DOCUMENTS 6,091,364 A * 7/2000 Murakami ........... H01Q 9/0471
343/846
7,226,856 B1 * 6/2007 Lopatin ............. H01L 21/76844
977/723

(Continued)

FOREIGN PATENT DOCUMENTS

JP 63-199503 A 8/1988
JP 1-176970 A 7/1989
(Continued)

OTHER PUBLICATIONS

International Search Report and Written Opinion mailed on May 11, 2021, received for PCT Application PCT/JP2021/005805, filed on Feb. 17, 2021, 8 pages including English Translation.

*Primary Examiner* — Thien M Le
(74) *Attorney, Agent, or Firm* — XSENSUS LLP

(57) ABSTRACT

An antenna module includes a dielectric substrate, in or on which a feed element is formed, a dielectric substrate, in which a ground electrode (GND) is formed, and conductive members. The dielectric substrate is disposed opposite the dielectric substrate. When viewed in plan in the direction normal to the feed element, the conductive members are disposed around the feed element. An air layer is formed between the dielectric substrate and the dielectric substrate. The conductive members are formed in the air layer.

17 Claims, 21 Drawing Sheets

(58) Field of Classification Search
CPC ........... H04W 52/0245; H04W 72/044; H04W 72/0453; H04W 72/23; H04W 76/20; H01Q 1/2283; H01Q 1/38; H01Q 21/065; H01Q 5/378; H01Q 9/0414; H01Q 9/0442; H04B 7/0413; H04B 7/06
See application file for complete search history.

(56) References Cited

U.S. PATENT DOCUMENTS

| | | | |
|---|---|---|---|
| 2005/0179131 A1* | 8/2005 | Homma | H01L 24/13 257/737 |
| 2005/0264729 A1* | 12/2005 | Lin | G02F 1/133555 349/114 |
| 2006/0267385 A1* | 11/2006 | Steenwyk | B60N 2/06 297/217.1 |
| 2007/0036996 A1* | 2/2007 | Sugimoto | H01G 4/129 428/701 |
| 2009/0179815 A1* | 7/2009 | Sotoma | H01Q 9/42 343/787 |
| 2019/0089044 A1* | 3/2019 | Kobuke | H01L 21/4807 |
| 2020/0098709 A1* | 3/2020 | Lin | H01L 23/3128 |
| 2020/0335860 A1* | 10/2020 | Hasegawa | H01Q 13/206 |

FOREIGN PATENT DOCUMENTS

| | | |
|---|---|---|
| JP | 2000-138525 A | 5/2000 |
| WO | 2016/067969 A1 | 5/2016 |

\* cited by examiner

FIG.3

| CONFIGURATION | FIRST COMPARISON EXAMPLE | SECOND COMPARISON EXAMPLE | FIRST EMBODIMENT |
|---|---|---|---|
| RETURN LOSS | | | |
| BANDWIDTH | 3.2 [GHz] | 3.4 [GHz] | 3.4 [GHz] |
| PEAK GAIN | 6.64 [dB] | 6.87 [dB] | 6.72 [dB] |
| -3 dB ANGLE | 92.0 [deg] | 88.4 [deg] | 89.2 [deg] |

FIG.4 BASIC WAVE CHARACTERISTICS

FIG.8

| CONFIGURATION | SECOND EMBODIMENT | THIRD EMBODIMENT |
|---|---|---|
| PEAK GAIN | 6.72[dBi] | 6.65[dBi] |
| -3 dB ANGLE | 89.2[deg] | 90.4[deg] |

ANTENNA MODULE AND COMMUNICATION DEVICE INCLUDING THE SAME

CROSS REFERENCE TO RELATED APPLICATIONS

The present application is a bypass continuation of PCT Application PCT/JP2021/005805, filed Feb. 17, 2021, which claims priority to Japanese patent application JP 2020-039703, filed Mar. 9, 2020, the entire contents of each of which being incorporated herein by reference.

TECHNICAL FIELD

The present disclosure relates to an antenna module and a communication device including the same, and, more particularly, relates to a technique for achieving return loss reduction in a wide bandwidth and a wide directivity in an antenna module.

BACKGROUND ART

International Publication No. 2016/067969 (Patent Document 1) discloses an antenna module including a feed element and a radio-frequency semiconductor device which are integral with a dielectric substrate. The antenna module disclosed in International Publication No. 2016/067969 (Patent Document 1) is included, for example, in a portable terminal, such as a cellular phone or a smartphone.

CITATION LIST

Patent Document

Patent Document 1: International Publication No. 2016/067969

SUMMARY

Technical Problems

For portable terminals, in addition to a demand for reduction in size and in thickness, there has been a demand for further improvement of antenna characteristics, such as return loss and gain.

Typically, for acquisition of return loss in a wider bandwidth, the following methods are known: a method in which the distance between a radiating element and a ground electrode is increased; a method in which the effective dielectric constant of a dielectric substrate included in an antenna module is decreased. However, as recognized by the present inventors, in the former method, the entire antenna module has a larger thickness, which prevents the antenna module from having a small size and a low profile.

In the latter method, whereas the reflection characteristics in a wider bandwidth are obtained due to decrease of the effective dielectric constant, the peak gain may be made large and the directivity may be changed to a sharp one, resulting in a narrow beam width in which a predetermined gain is attainable. That is, when the effective dielectric constant is decreased, return loss reduction in a wide bandwidth and acquisition of a wide directivity have a tradeoff relationship.

The present disclosure is made to solve such an issue, as well as other issues, and one aspect thereof is to achieve return loss reduction in a wide bandwidth and a wide directivity in an antenna module.

Solutions to Problems

An antenna module according to an aspect of the present disclosure includes a first dielectric substrate, in or on which a first radiating element is disposed, a second dielectric substrate, in which a ground electrode is disposed, and a conductive member. The second dielectric substrate is disposed opposite the first dielectric substrate. When viewed in plan in the direction normal to the first radiating element, the conductive member is disposed around the first radiating element. A low-dielectric-constant layer having a dielectric constant lower than that of the first dielectric substrate is disposed between the first dielectric substrate and the second dielectric substrate. The conductive member is formed in the low-dielectric-constant layer.

An antenna module according to another aspect of the present disclosure includes a first dielectric substrate, in or on which a first radiating element is disposed, a second dielectric substrate, in which a ground electrode is disposed, and a conductive member. The second dielectric substrate is disposed opposite the first dielectric substrate. When viewed in plan in the direction normal to the first radiating element, the conductive member is disposed around the first radiating element. An air layer is positioned between the first dielectric substrate and the second dielectric substrate. The conductive member is formed in the air layer.

Advantageous Effects

An antenna module of the present disclosure includes a dielectric substrate comprising a first dielectric substrate, which includes a radiating element, and a second dielectric substrate, which includes a ground electrode. A low-dielectric-constant layer (air layer) having a dielectric constant lower than that of the first dielectric substrate is formed between the two dielectric substrates. Forming the low-dielectric-constant layer causes reduction of the effective dielectric constant, achieving return loss reduction in a wide bandwidth. In addition, arrangement of conductive members around the radiating element in the low-dielectric-constant layer causes part of an electromagnetic field, which occurs between the radiating element and the ground electrode, to be blocked, achieving a wide directivity.

BRIEF DESCRIPTION OF DRAWINGS

FIG. 3 is a diagram for describing antenna characteristics of an antenna module according to the first embodiment and those of antenna modules according to comparison examples.

FIG. 8 is a diagram for describing antenna characteristics of an antenna module according to a third embodiment.

DESCRIPTION OF EMBODIMENTS

Figure 1:
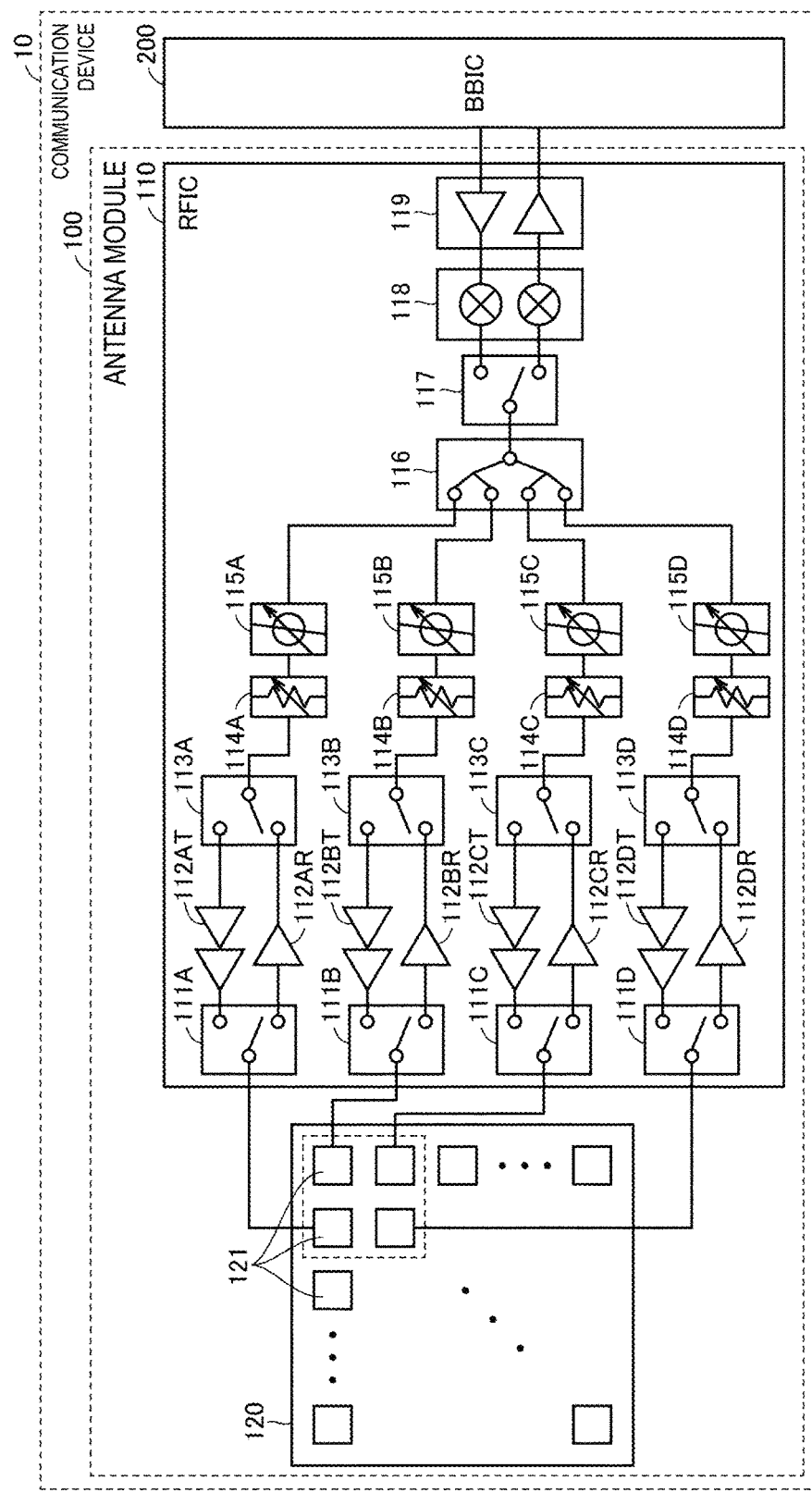
FIG. 1 is a block diagram illustrating a communication device to which an antenna module according to a first embodiment is applied.

Embodiments of the present disclosure will be described in detail below by referring to the drawings. Components identical or equivalent to each other in the figures are designated with identical reference numerals, and repeated description will be avoided.

First Embodiment (Basic Configuration of a Communication Device)

FIG. 1 is an exemplary block diagram illustrating a communication device 10 to which an antenna module 100 according to a first embodiment is applied. The communication device 10 is, for example, a portable terminal, such as a cellular phone, a smartphone, or a tablet computer, a personal computer having a communication function, or a base station. Examples of the frequency band of radio waves used in the antenna module 100 according to the present embodiment include radio waves in millimeter-wave bands having center frequencies, for example, of 28 GHz, 39 GHz, and 60 GHz. However, radio waves of frequency bands other than those described above may be used.

Referring to FIG. 1, the communication device 10 includes the antenna module 100 and a BBIC 200 which forms a baseband-signal processing circuit. The antenna module 100 includes a radio-frequency (RF) integrated circuit (RFIC) 110 which is an exemplary feed circuit, and an antenna device 120. The communication device 10 upconverts signals, which are transmitted from the BBIC 200 to the antenna module 100, into radio frequency signals, and emits the radio frequency signals from the antenna device 120. In addition, the communication device 10 downconverts radio frequency signals, which are received by the antenna device 120, and processes the down-converted signals by using the BBIC 200.

To make the description simple, FIG. 1 illustrates only the configuration, which corresponds to four of multiple feed elements 121 included in the antenna device 120, and does not illustrate the configuration which corresponds to the other feed elements 121 and which is substantially the same. The term "feed element" is intended as a transmit and/or receive device that, in a transmit context, is actively fed with RF energy which is then launched by a radiation element (e.g., patch antenna) into a wireless propagation medium as electromagnetic waves, and in a receive context operates in a reciprocal process by converting electromagnetic waves from a wireless medium into electrical energy (current and/or field) in a tangible medium. FIG. 1 illustrates an example in which the antenna device 120 is formed by using multiple feed elements 121 arranged in a two-dimensional array. However, the feed elements 121 are not necessarily more than one. The antenna device 120 may be formed by using a single feed element 121. Alternatively, a one-dimensional array, in which multiple feed elements 121 are arranged in a line, may be employed. In the present embodiment, the feed elements 121 are patch antennas each having a substantially-square planar shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/splitter 116, a mixer 118, and an amplifying circuit 119.

In transmission of radio frequency signals, the switches 111A to 111D and 113A to 113D are switched to the power amplifiers 112AT to 112DT side, and the switch 117 is connected to the amplifier for transmission in the amplifying circuit 119. In reception of radio frequency signals, the switches 111A to 111D and 113A to 113D are switched to the low-noise amplifiers 112AR to 112DR side, and the switch 117 is connected to the amplifier for reception in the amplifying circuit 119.

A signal transmitted from the BBIC 200 is amplified by the amplifying circuit 119, and the amplified signal is upconverted by the mixer 118. The transmit signal, which is an upconverted radio frequency signal, is split into four signals by the signal combiner/splitter 116. The split signals pass through the respective four signal paths to be fed to the respective different feed elements 121. At that time, the degrees of phase shift in the phase shifters 115A to 115D disposed on the respective signal paths are adjusted individually, achieving adjustment of the directivity of the antenna device 120.

Receive signals, which are radio frequency signals received by the feed elements 121, pass the respective four different signal paths, and are combined by the signal combiner/splitter 116. The combined receive signal is down-converted by the mixer 118. The down-converted signal is amplified by the amplifying circuit 119 for transmission to the BBIC 200.

The RFIC 110 is formed, for example, as a single-chip integrated circuit component including the circuit configuration described above. Alternatively, the equipment (the switches, the power amplifier, the low-noise amplifier, the attenuator, and the phase shifter), corresponding to each feed element 121, in the RFIC 110 may be formed as a single-chip integrated circuit component.

(The Configuration of the Antenna Module)

Figure 2:
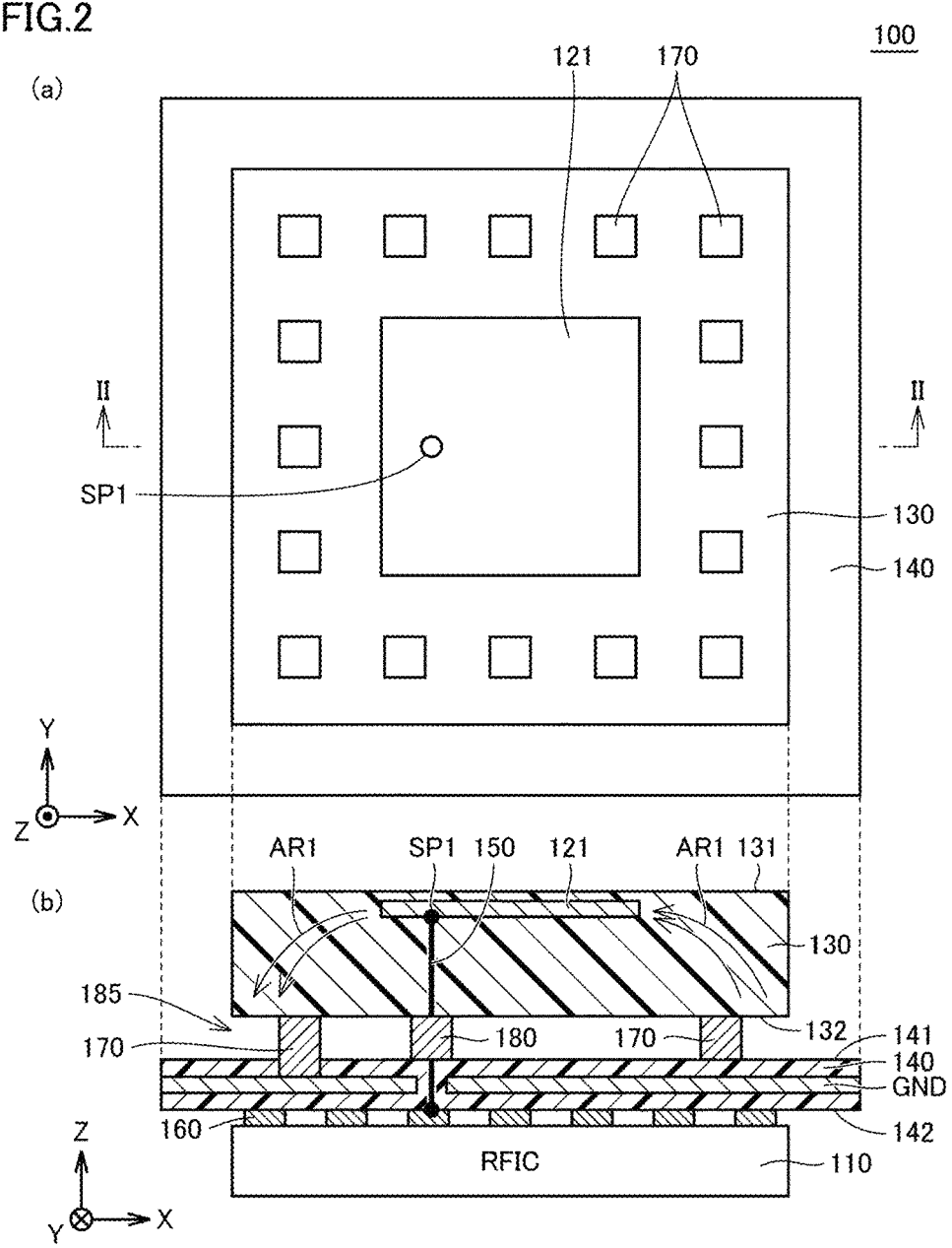
FIG. 2 includes a plan view and a cross-sectional view of an antenna module according to the first embodiment.

The configuration of the antenna module 100 according to the first embodiment will be described in detail. FIG. 2 illustrates, in the upper row (FIG. 2(*a*)), a plan view of the antenna module 100, and illustrates, in the lower row (FIG. 2(*b*)), a cross-sectional view along line II-II in the plan view.

Referring to FIG. 2, the antenna module 100 includes, in addition to a feed element 121 and the RFIC 110, dielectric substrates 130 and 140, a feed wiring line 150, conductive members 170 and 180, and a ground electrode GND. In the description below, the Z-axis positive direction in the figures may be called the top surface side, and the Z-axis negative direction may be called the undersurface side. In the plan view in FIG. 2(*a*), part of the dielectric substrate 130 is not illustrated to make the internal configuration easy to view.

Examples of the dielectric substrates 130 and 140 include a low temperature co-fired ceramics (LTCC) multilayer substrate, a multilayer resin substrate formed by laminating multiple resin layers formed of resin, such as epoxy or polyimide, a multilayer resin substrate formed by laminating multiple resin layers formed of liquid crystal polymer (LCP) having a lower dielectric constant, a multilayer resin substrate formed by laminating multiple resin layers formed of fluoroplastics, and a ceramic multilayer substrate formed of ceramic other than LTCC. The dielectric substrates 130 and 140 do not necessarily have a multilayer structure, and may have a single-layer substrate. The antenna module 100 illustrated in FIG. 2 will be described by taking an example in which the dielectric substrate 130 is formed of polyimide and the dielectric substrate 140 is formed of LTCC. Alternatively, the dielectric substrate 130 and the dielectric substrate 140 may be formed of the same material.

The dielectric substrate 130 and the dielectric substrate 140 have a rectangular planar shape. The rear face 132 of the dielectric substrate 130 and the front face 141 of the dielectric substrate 140 are disposed so as to be opposite each other with a predetermined space interposed in between. That is, an air layer 185 is formed between the dielectric substrate 130 and the dielectric substrate 140. The conductive members 170 and 180 are formed in the air layer 185. The dielectric substrate 130 is connected to the dielectric substrate 140 through the conductive members 170 and 180.

The feed element 121, having a substantially-square shape, is disposed in an internal layer of the dielectric substrate 130 or on the front face 131 on the top surface side. The ground electrode GND is disposed in the dielectric substrate 140. The conductive members 170 and 180 connect with the front face 141 which is the top surface side of the dielectric substrate 140. The RFIC 110 is disposed on the rear face 142, which is the undersurface side, with solder bumps 160 interposed in between.

The feed wiring line 150 extends from the RFIC 110 through the ground electrode GND, and reaches a feeding point SP1 of the feed element 121 through the conductive member 180. The conductive member 180 functions as a connection electrode for connecting the portion, in the dielectric substrate 130, of the feed wiring line 150 to the portion in the dielectric substrate 140. This configuration causes transmission of a radio frequency signal, which is supplied from the RFIC 110, through the feed wiring line 150 to the feeding point SP1 of the feed element 121. The feeding point SP1 is disposed at a position shifted from the center (the point of intersection of the diagonal lines) of the feed element 121 in the X-axis negative direction in FIG. 2.

A radio frequency signal is supplied to the feeding point SP1. Thus, radio waves, whose polarization direction is X-axis direction, are emitted from the feed element 121. The portion, in the dielectric substrate 130, of the feed wiring line 150 is not necessary. When the thickness of the dielectric substrate 130 is relatively thin, capacitance coupling between the conductive member 180 and the feed element 121 may be used to supply a radio frequency signal to the feed element 121 in a non-contact manner.

Figure 22:
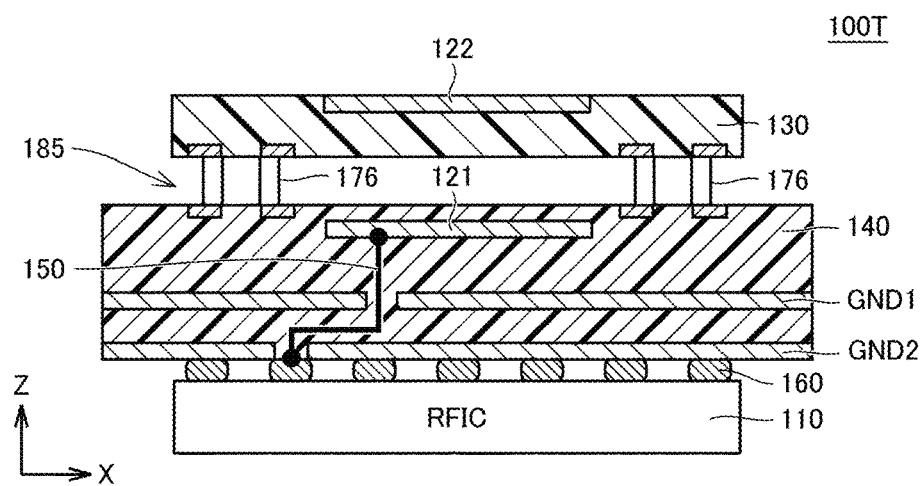
FIG. 22 is a cross-sectional view of an antenna module according to a ninth embodiment.

The conductive members 170 are any devices or members formed of a conductive material. The conductive members 170 may be, for example, solder bumps, which are described in a second embodiment (FIG. 6), and/or electrode connecting material components, such as columnar conductor posts, conductor pins, and plated electrodes (terminals). The conductive members 170 may be electronic components (such as resistors and capacitors) described in a ninth embodiment (FIG. 22). In the antenna module 100, the conductive members 170 are rectangular conductive material components having a size smaller than that of the feed element 121.

In the antenna module 100, the conductive members 170 are disposed around the feed element 121 so as to be spaced apart from the feed element 121 when the antenna module 100 is viewed in plan in the direction normal to the planar feed element 121. More specifically, the conductive members 170 are disposed along the sides of the rectangular feed element 121 so as to be spaced apart from each other.

The conductive members 170 are provided to prevent part of an electromagnetic field which occurs between the feed element 121 and the ground electrode GND, as described below. Therefore, when the wavelength of radio waves emitted from the feed element 121 is set to λ, the conductive members 170 are preferably disposed in a range within λ/4 from the feed element 121. As illustrated in FIG. 2(*b*), the conductive members 170 may be connected to the ground electrode GND directly, or may be connected to the ground electrode GND through capacitance coupling indirectly.

The antenna module as described above may be used in a portable terminal such as a cellular phone or a smartphone. For portable terminals in recent years, there has been a demand for achieving antenna characteristics, such as return loss and gain, in a further wider bandwidth, in addition to a demand for reduction in size and in thickness.

Typically, for acquisition of return loss in a wider bandwidth in an antenna module including a planar patch antenna, the following methods are known: a method in which the distance between a radiating element and a ground electrode is increased; a method in which an effective dielectric constant of a dielectric substrate included in an antenna module is decreased. However, an increase of the distance between a radiating element and a ground electrode as in the former method results in the entire antenna module having a larger thickness, which may prevent the antenna module from having a low profile and a small size.

In contrast, when the effective dielectric constant of a dielectric substrate is decreased as in the latter method, in addition to return loss in a wider bandwidth, the peak gain may be increased, and a sharp directivity may be obtained. An increase of peak gain itself is desirable because the reachable range of radio waves is increased. However, concentration of energy of emitted radio waves in a certain direction may cause a space, in which a predetermined gain is attainable, to be narrowed. This may cause a desired gain to fail to be obtained in a spatial range which is a target.

In the antenna module 100 according to the first embodiment, the feed element 121 and the ground electrode GND are formed in the different dielectric substrates 130 and 140, respectively. The air layer 185 is formed between the dielectric substrate 130 and the dielectric substrate 140. Typically, the dielectric constant of air is lower than those of the dielectric substrates 130 and 140. Therefore, the air layer 185 formed between the dielectric substrates as in the antenna module 100 enables the effective dielectric constant between the feed element 121 and the ground electrode GND to be decreased, compared with the case without the air layer 185. This enables return loss to be reduced, achieving return loss in a wider bandwidth.

Further, in the antenna module 100 according to the first embodiment, as described above, the conductive members 170 are disposed in the air layer 185 around the feed element 121 in plan view. The antenna module 100 functions as an antenna through electromagnetic-field coupling between the feed elements 121 and the ground electrode GND, and an electromagnetic field occurs between the feed element 121 and the ground electrode GND. An electric flux at that time occurs mainly between the ground electrode GND and the side orthogonal to the polarization direction of the feed element 121 (that is, the side parallel to Y axis in FIG. 2), as illustrated by using arrows AR1 in FIG. 2. Therefore, the conductive members 170 disposed at positions spaced apart from the feed element 121 capture part of the electromagnetic field which occurs. Thus, although the peak gain at the resonant frequency is slightly decreased, a reduction of gain in a wide range may be suppressed. Therefore, while return loss in a wider bandwidth is maintained, occurrence of a narrower directivity may be suppressed.

FIG. 3 is a diagram for describing antenna characteristics of the antenna module 100 according to the first embodiment. In FIG. 3, the antenna characteristics of the antenna module 100 according to the first embodiment will be described in comparison with the antenna characteristics of two comparison examples. FIG. 3 illustrates the following types of information in the upper row and its subsequent rows: the configurations of antenna modules according to the first embodiment and the first and second comparison examples; graphs of return loss; the bandwidths in which return loss is less than 6 dB; the peak gains; and the angles at which a peak gain of −3 dB is attained (hereinafter referred to as "−3 dB angles").

Figure 4:
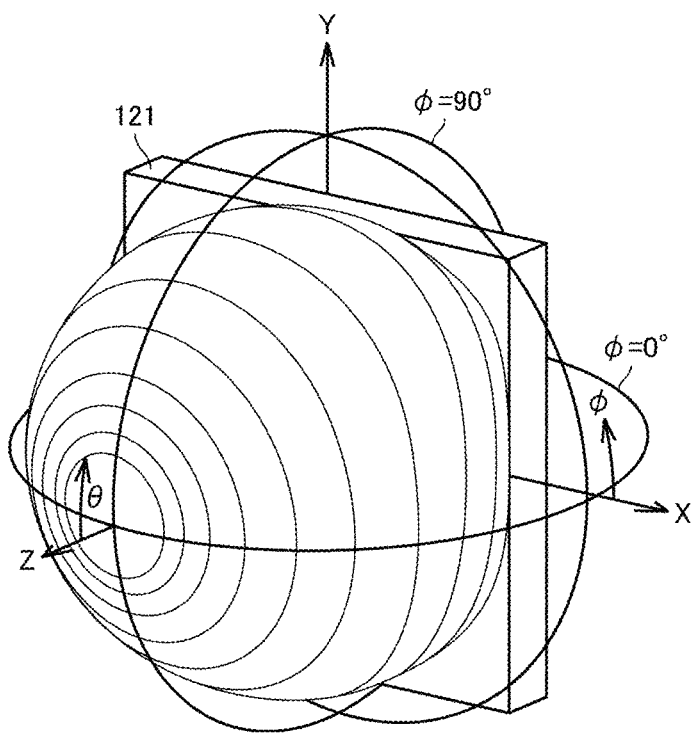
FIG. 4 is a diagram for describing gain characteristics of an antenna module.
Figure 5:
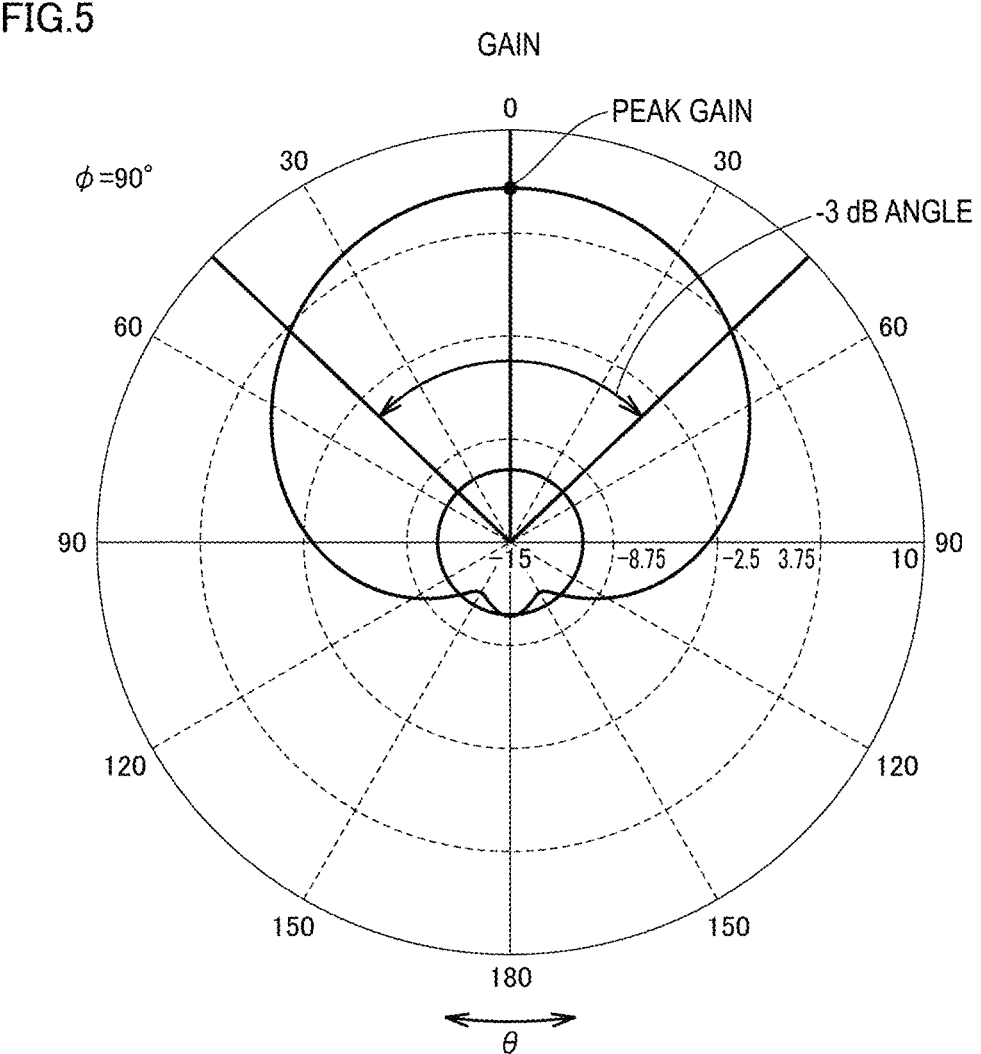
FIG. 5 is a diagram for describing the directivity of an antenna module.

The definitions of "peak gain" and "−3 dB angle" will be described in detail by using FIGS. 4 and 5. FIG. 4 is a diagram illustrating the gain of radio waves, which are emitted from a feed element 121, three-dimensionally. In FIG. 4, the tilt angle from X axis around Z axis is represented by "φ"; the tilt angle from Z axis around X axis is represented by "θ". As illustrated in FIG. 4, the gain has a peak in the Z-axis positive direction. FIG. 5 is a diagram illustrating the gain, which is obtained when the tilt angle φ around Z axis is 90°, by using the tilt angle θ around X axis as a parameter. In the present embodiment, the maximum of the gain in FIG. 5 is defined as "peak gain", and the width of the tilt angle θ in which the gain is decreased by 3 dB from the peak gain is defined as "−3 dB angle". In other words, "−3 dB angle" corresponds to the emission angle of radio waves.

Back to FIG. 3, an antenna module 100 #1 according to the first comparison example is an antenna module having a configuration in which no air layer is provided between the feed element 121 and the ground electrode GND. An antenna module 100 #2 according to the second comparison example is an antenna module having a configuration in which the conductive members 170 are excluded from the configuration of the first embodiment.

In the antenna module 100 #1 according to the first comparison example, the frequency bandwidth, in which return loss is equal to or less than 6 dB, is 3.2 GHz; the peak gain is 6.64 dB; the −3 dB angle is 92.0°. In the second comparison example, the frequency bandwidth, in which return loss is equal to or less than 6 dB, is 3.4 GHz, which indicates acquisition of a wider bandwidth than that of the first comparison example. In contrast, the peak gain is 6.87 dB, which is larger than that of the first comparison example; the −3 dB angle is 88.4°, which is narrower than that of the first comparison example.

In contrast, in the antenna module 100 according to the first embodiment, the frequency bandwidth, in which return loss is equal to or less than 6 dB, is 3.4 GHz, which is, like the second comparison example, a wider bandwidth than that of the first comparison example. The peak gain is 6.72 dB, which is larger than that of the first comparison example, but is smaller than that of the second comparison example. The −3 dB angle is an intermediate value (89.2°) between the first comparison example and the second comparison example. That is, compared with the second comparison example, while the first embodiment maintains the frequency bandwidth, the first embodiment achieves a wide directivity.

Influence of the conductive members 170 on the gain may change depending on the size of the disposed conductive members 170, the number of conductive members 170, their positions, their conductivity, and the like. Therefore, the arrangement of the conductive members 170 is selected as appropriate in accordance with the desired gain characteristics.

As described above, a feed element and a ground electrode are formed in the respective different dielectric substrates, and an air layer is formed between the two dielectric substrates in an antenna module. Thus, return loss reduction in a wide bandwidth and a wide directivity may be achieved.

The "feed element 121" in the first embodiment corresponds to a "first radiating element" in the present disclosure. The "dielectric substrate 130" and the "dielectric substrate 140" in the first embodiment correspond to a "first dielectric substrate" and a "second dielectric substrate", respectively, in the present disclosure. The "air layer 185" in the first embodiment corresponds to a "low-dielectric-constant layer" and an "air layer" in the present disclosure.

Second Embodiment

In the second embodiment, the case in which each conductive member is formed by an electrode connecting material component will be described.

Figure 6:
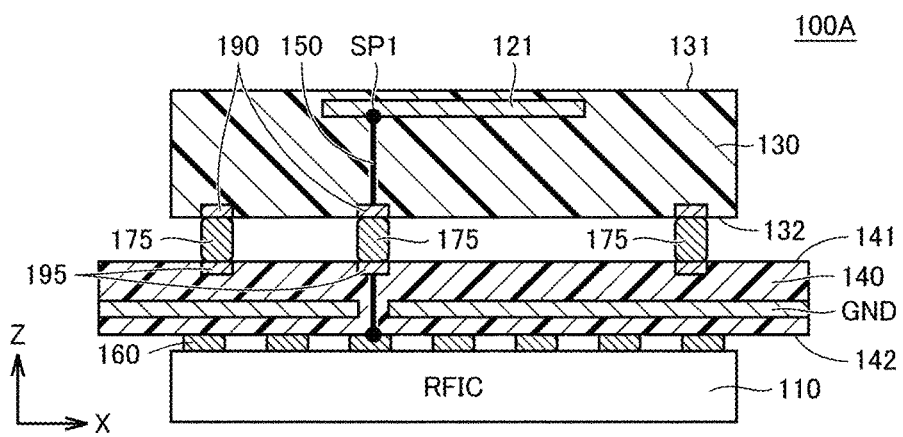
FIG. 6 is a cross-sectional view of an antenna module according to a second embodiment.

FIG. 6 is a cross-sectional view of an antenna module 100A according to the second embodiment. Referring to FIG. 6, the antenna module 100A has a configuration in which the conductive members 170 and 180 of the antenna module 100 according to the first embodiment are formed by electrode connecting material components 175, and in which the other configuration is substantially the same as that of the antenna module 100. For example, solder may be used as the electrode connecting material components 175. The electrode connecting material components 175 connect with electrode pads 190, which are formed on the rear face 132 of the dielectric substrate 130, and electrode pads 195, which are formed on the front face 141 of the dielectric substrate 140.

Figure 7:
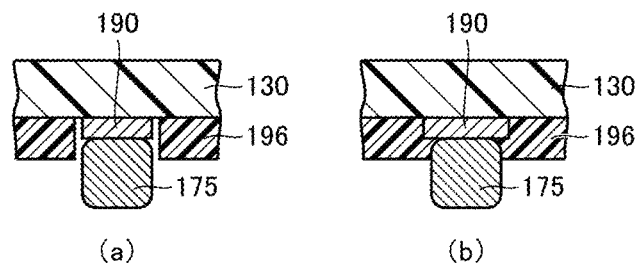
FIG. 7 includes diagrams illustrating details of the vicinity of a conductive member formed in the case where a resist is applied on a dielectric substrate.

A resist for protection may be formed on the rear face 132 of the dielectric substrate 130 and the front face 141 of the dielectric substrate 140. As illustrated in FIG. 7, a resist 196 may be configured as a clearance resist (FIG. 7(a)) in which the resist 196 is formed with clearances interposed between the electrode pads and the resist 196. Alternatively, the resist 196 may be configured as an over resist (FIG. 7(b)) in which the resist 196 is formed so as to cover parts of the electrode pads.

The antenna characteristics of the antenna module 100A according to the second embodiment is basically equivalent to those of the antenna module 100 according to the first embodiment, which is illustrated in FIG. 3, as long as the conductivity of the conductive members is the same as that of the electrode connecting material components. Therefore, the antenna module 100A also achieves return loss reduction in a wide bandwidth and a wide directivity.

Third Embodiment

In a third embodiment, a configuration in which vias, which connect with conductive members, are further formed in the dielectric substrate in which the ground electrode is disposed will be described.

FIG. 8 is a diagram for describing the antenna characteristics of an antenna module 100B according to the third embodiment. In the description using FIG. 8, the antenna module 100A according to the second embodiment is used as a comparison example.

Referring to FIG. 8, the antenna module 100B according to the third embodiment includes via electrodes 197, which connect with electrode pads 195 in the dielectric substrate 140, in addition to the configuration of the antenna module 100A according to the second embodiment. One end of each via electrode 197 connects with a corresponding electrode pad 195. The other end is open so as to connect with no other conductive members. Such via electrodes cause an increase of the area, in which the electromagnetic field is blocked, between the feed element 121 and the ground electrode GND. As a result, this enables adjustment of the directivity.

As illustrated in FIG. 8, the antenna module 100A, which does not have the via electrodes 197, has a peak gain of 6.72 dB, and has a −3 dB angle of 89.2°. In contrast, the antenna module 100B according to the third embodiment, which has the via electrodes 197, has a peak gain of 6.65 dB, and has a −3 dB angle of 90.4°. That is, the antenna module 100B has an increased directivity.

As described above, via electrodes, which connect with conductive members disposed in an air layer, are formed in the dielectric substrate in which the ground electrode is formed, achieving a further increased directivity.

The "via electrode 197" in the third embodiment corresponds to a "first via electrode" in the present disclosure.

Fourth Embodiment

In a fourth embodiment, a configuration in which the antenna characteristics are adjusted by changing the position of the air layer between the feed element and the ground electrode will be described.

Figure 9:
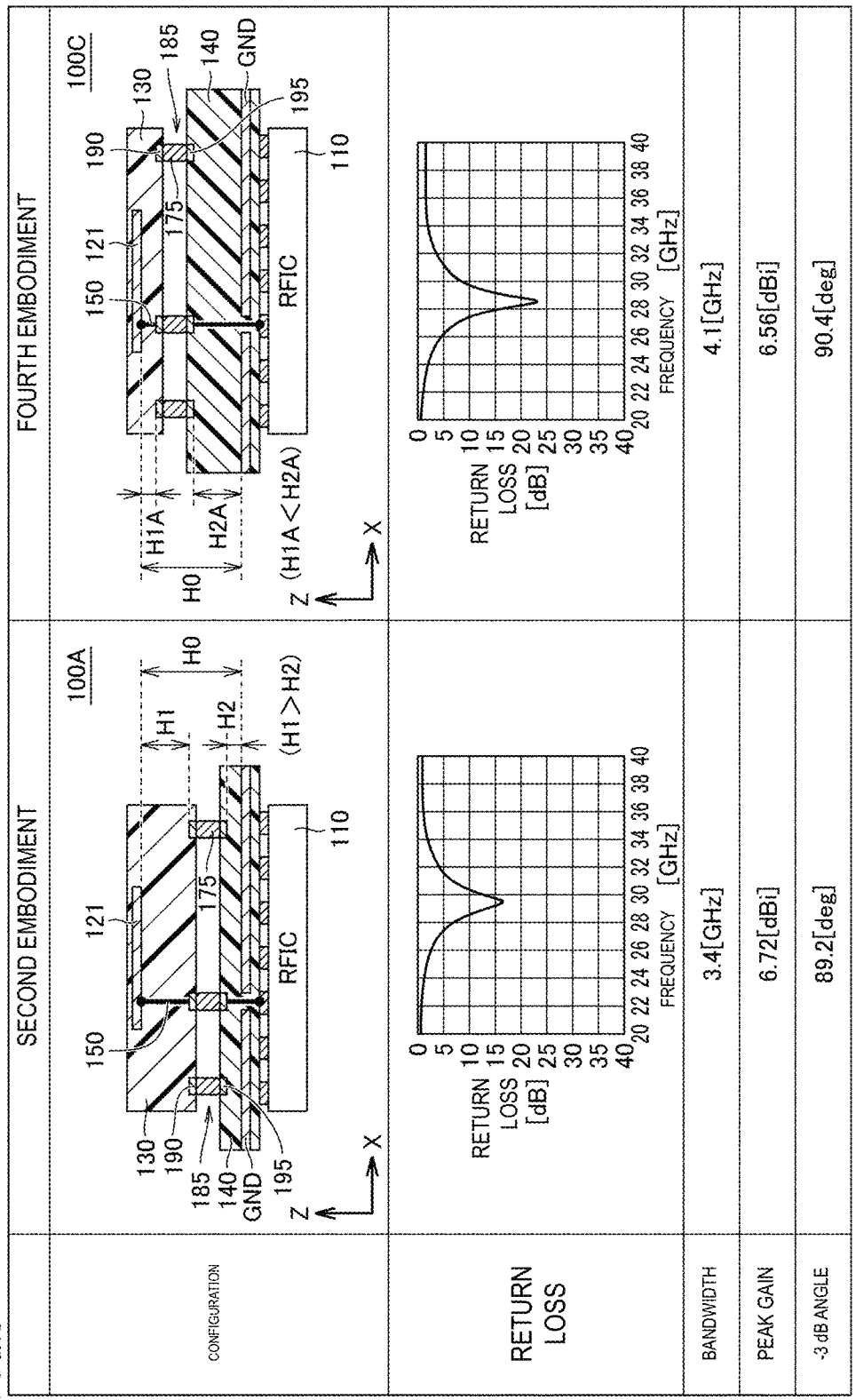
FIG. 9 is a diagram for describing antenna characteristics of an antenna module according to a fourth embodiment.

FIG. 9 is a diagram for describing the antenna characteristics of an antenna module 100C according to the fourth embodiment. FIG. 9 uses the antenna module 100A according to the second embodiment as a comparison example.

The basic configuration of the antenna module 100C is similar to that of the antenna module 100A according to the second embodiment. The difference is that, in the antenna module 100C, the air layer 185 is formed closer to the feed element 121 than in the antenna module 100A. More specifically, in the antenna module 100A and the antenna module 100C, the distance H0 between the feed element 121 and the ground electrode GND is the same. However, in the antenna module 100A, the distance H1 from the feed element 121 to the conductive members (electrode pads 190) in the dielectric substrate 130 is made larger than the distance H2 from the ground electrode GND to the conductive members (electrode pads 195) in the dielectric substrate 140 (H1>H2). In contrast, in the antenna module 100C, the distance H1A from the feed element 121 to the conductive members (electrode pads 190) in the dielectric substrate 130 is made smaller than the distance H2A from the ground electrode GND to the conductive members (electrode pads 195) in the dielectric substrate 140 (H1A<H2A).

Typically, the strength of the electromagnetic field formed between the feed element 121 and the ground electrode GND tends to be stronger at a position at which the feed element 121 is closer. Therefore, the air layer 185, which is located closer to the feed element 121, produces a larger effect from reduction of the effective dielectric constant and produces a larger effect of widening the frequency bandwidth. In addition, when the air layer 185 is formed closer to the feed element 121, the conductive members are accordingly located closer to the feed element 121, resulting in an increase of an electromagnetic field blocked by the conductive members. Therefore, the closer the air layer 185 is to the feed element 121, the larger the effect of expanding the directivity is.

In the example in FIG. 9, when the antenna module 100A is compared with the antenna module 100C, the frequency bandwidth related to return loss increases from 3.4 GHz to 4.1 GHz. In addition, the −3 dB angle increases from 89.2° to 90.4°. Therefore, the air layer 185 is made closer to the feed element 121 by adjusting the thicknesses of the dielectric substrates 130 and 140, achieving return loss reduction in a wide bandwidth and a wide directivity.

The peak gain of the antenna module 100C is 6.56 dB, which is lower than the peak gain (6.64 dB) of the antenna module 100 #1, having no air layer, in FIG. 3. Therefore, a case which is not suitable for the configuration of the antenna module 100C may occur depending on the specification of a necessary peak gain. That is, when importance is placed on peak gain, as in the antenna module 100A, the distance between the feed element 121 and the electrode pads 190 in the dielectric substrate 130 is preferably larger than the distance between the ground electrode GND and the electrode pads 195 in the dielectric substrate 140.

Conversely, when importance is placed on a wider directivity, as in the antenna module 100C, the distance between the feed element 121 and the electrode pads 190 in the dielectric substrate 130 is preferably smaller than the distance between the ground electrode GND and the electrode pads 195 in the dielectric substrate 140.

Fifth Embodiment

In a fifth embodiment, a configuration in which a phase adjusting circuit is formed on the feed wiring line through which radio frequency signals are transmitted to the feed element from the RFIC will be described.

Figure 10:
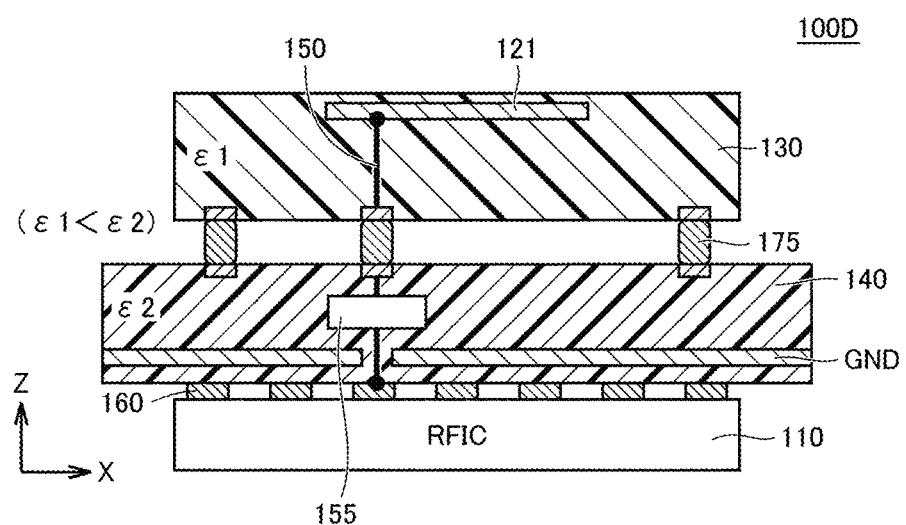
FIG. 10 is a cross-sectional view of an antenna module according to a fifth embodiment.

FIG. 10 is a cross-sectional view of an antenna module 100D according to the fifth embodiment. The antenna module 100D includes a phase adjusting circuit 155, which is formed on the feed wiring line 150 in the dielectric substrate 140, in addition to the configuration of the antenna module 100A in the second embodiment. The dielectric constant ε2 of the dielectric substrate 140 is made larger than the dielectric constant ε1 of the dielectric substrate 130 (ε1<ε2).

The phase adjusting circuit 155 is used, for example, when, in supplying a radio frequency signal to two different feeding points to emit radio waves having the same polarization direction, the phases of the supplied radio frequency signals are made opposite to each other by forming a coupler or a distributed constant filter using the line length and/or the capacitance pattern. Alternatively, the phase adjusting circuit 155 is used when, in supplying a radio frequency signal through the same feed wiring line to two radiating elements having different resonant frequencies, a stub is formed on the feed wiring line to remove a signal for the other.

The amount of phase adjustment by the phase adjusting circuit 155 is determined by the wavelength of a radio frequency signal passing through the dielectric substrate and the length of a line along which the phase adjusting circuit 155 is formed. Among these, the wavelength changes in accordance with the dielectric constant of the dielectric substrate in which the phase adjusting circuit 155 is formed. The higher the dielectric constant is, the shorter the wavelength is. Therefore, if the phase needs to be adjusted in a large degree and if the dielectric constant of the dielectric substrate is small, the size of the phase adjusting circuit 155 needs to be large. Therefore, a relatively larger dielectric constant of the dielectric substrate, in which the phase adjusting circuit 155 is formed, enables reduction in size of the phase adjusting circuit 155.

As described in the fourth embodiment, reduction of the effective dielectric constant is more effective when the dielectric constant of an area close to the feed element 121 is made lower. Therefore, the phase adjusting circuit 155 is formed in the dielectric substrate 140 farther from the feed element 121. In addition, the dielectric constant of the dielectric substrate 140 is higher than that of the dielectric substrate 130. This enhances the efficiency of return loss in a wider bandwidth and enables reduction of the phase adjusting circuit 155 in size.

Sixth Embodiment

In a sixth embodiment, a configuration in which conductive members disposed in the air layer are used to suppress occurrence of higher harmonic waves of radio waves emitted from the radiating element will be described.

Figure 11:
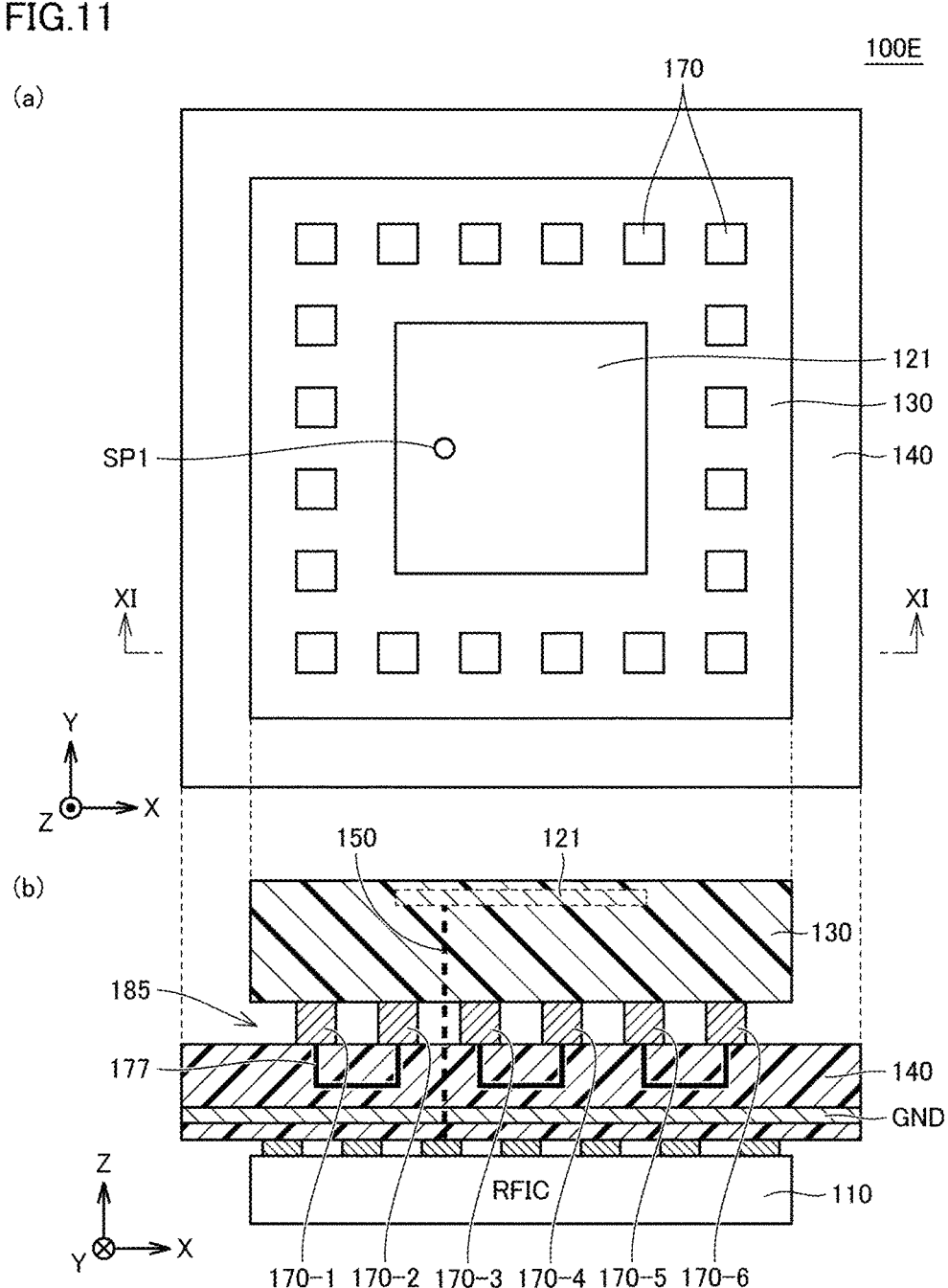
FIG. 11 includes a plan view and a cross-sectional view of an antenna module according to a sixth embodiment.

FIG. 11 is a diagram illustrating the configuration of an antenna module 100E according to the sixth embodiment. FIG. 11 illustrates a plan view of the antenna module 100E in the upper row (FIG. 11(a)), and illustrates a cross-sectional view along line XI-XI in the plan view in the lower row (FIG. 11(b)).

Referring to FIG. 11, like the antenna module 100 according to the first embodiment, the antenna module 100E includes the multiple conductive members 170, which are disposed in the air layer 185 along the sides of the substantially-square feed element 121. Each pair of adjacent conductive members 170 are connected to each other through a connection line 177 formed in the dielectric substrate 140. More specifically, six conductive members 170-1 to 170-6 are disposed along each side of the feed element 121. The pair of the conductive member 170-1 and the conductive member 170-2 is connected to each other through a connection line 177; the pair of the conductive member 170-3 and the conductive member 170-4 is connected through a connection line 177; the pair of the conductive member 170-5 and the conductive member 170-6 is connected through a connection line 177.

The length of a connection line 177 is set so that the resonant frequency of the configuration formed by a connection line 177 and two conductive members 170 connected by the connection line 177 is twice as high as the resonant frequency of the feed element 121. Thus, second harmonic waves emitted from the feed element 121 are captured by the configuration formed by a connection line 177 and conductive members 170. Therefore, the second harmonic wave components of radio waves emitted from the antenna module 100E may be reduced.

In the example described above, the case in which second harmonic wave components are reduced is described. Occurrence of Nth harmonic wave components may be suppressed by adjusting the length of each connection line 177 so that the resonant frequency of the configuration formed by a connection line 177 and two conductive members 170 connected by the connection line 177 is N times (N is an integer equal to or more than three) as high as the resonant frequency of the feed element 121. However, typically, the magnitude of third or higher harmonic wave components is less than that of second harmonic wave components. Thus, substantially, suppression of occurrence of second harmonic wave components results in sufficient reduction of influence of higher harmonic wave components.

Figure 12:
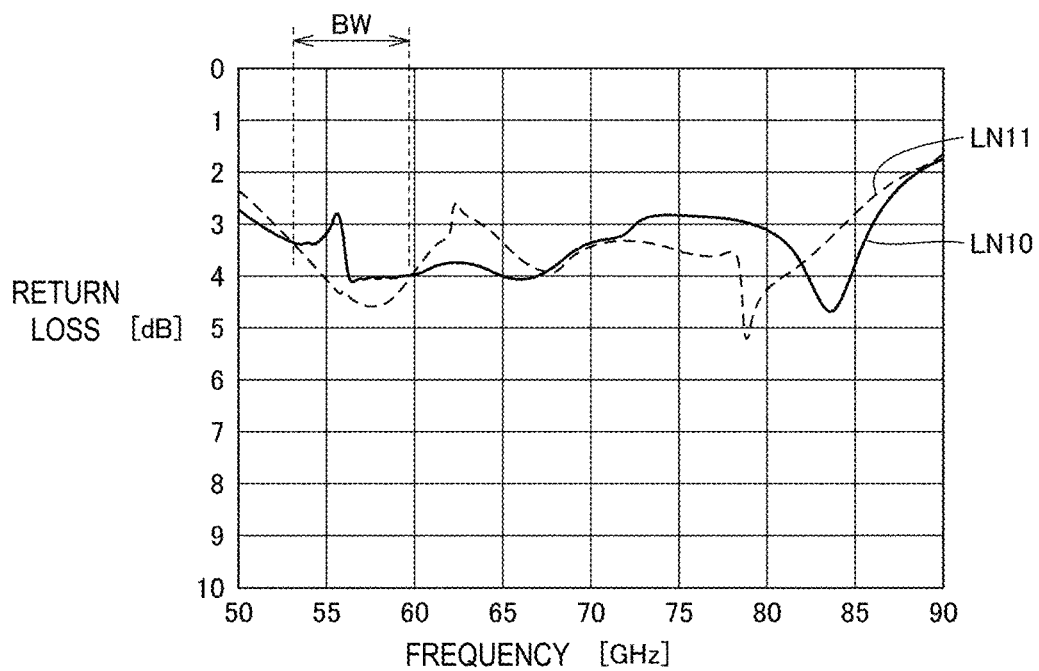
FIG. 12 is a diagram for describing return loss of second harmonic waves in the antenna module in FIG. 11.

FIG. 12 is a diagram for describing return loss of second harmonic waves in the antenna module 100E in FIG. 11. In FIG. 12, solid line LN10 indicates the case of the antenna module 100E according to the sixth embodiment, in which the conductive members 170 are connected to each other; broken line LN11 indicates the case of a comparison example in which the conductive members 170 are not connected to each other. In the example in FIG. 12, the frequency band of radio waves emitted from the feed element 121 is 26.5 to 29.5 GHz. Therefore, the frequency band of the second harmonic waves is 53 to 59 GHz.

As illustrated in FIG. 12, the return loss in the antenna module 100E is larger than the case of the comparison example in the frequency band of second harmonic waves (the range BW in FIG. 12). That is, in the antenna module 100E, second harmonic waves are difficult to be emitted compared with the comparison example. Therefore, influence of harmonic wave components of radio waves emitted from the feed element 121 is suppressed.

In the sixth embodiment, one of the conductive members connected by a connection line 177 corresponds to a "first member" in the present disclosure; the other conductive member corresponds to a "second member" in the present disclosure.

Modified Example

Figure 13:
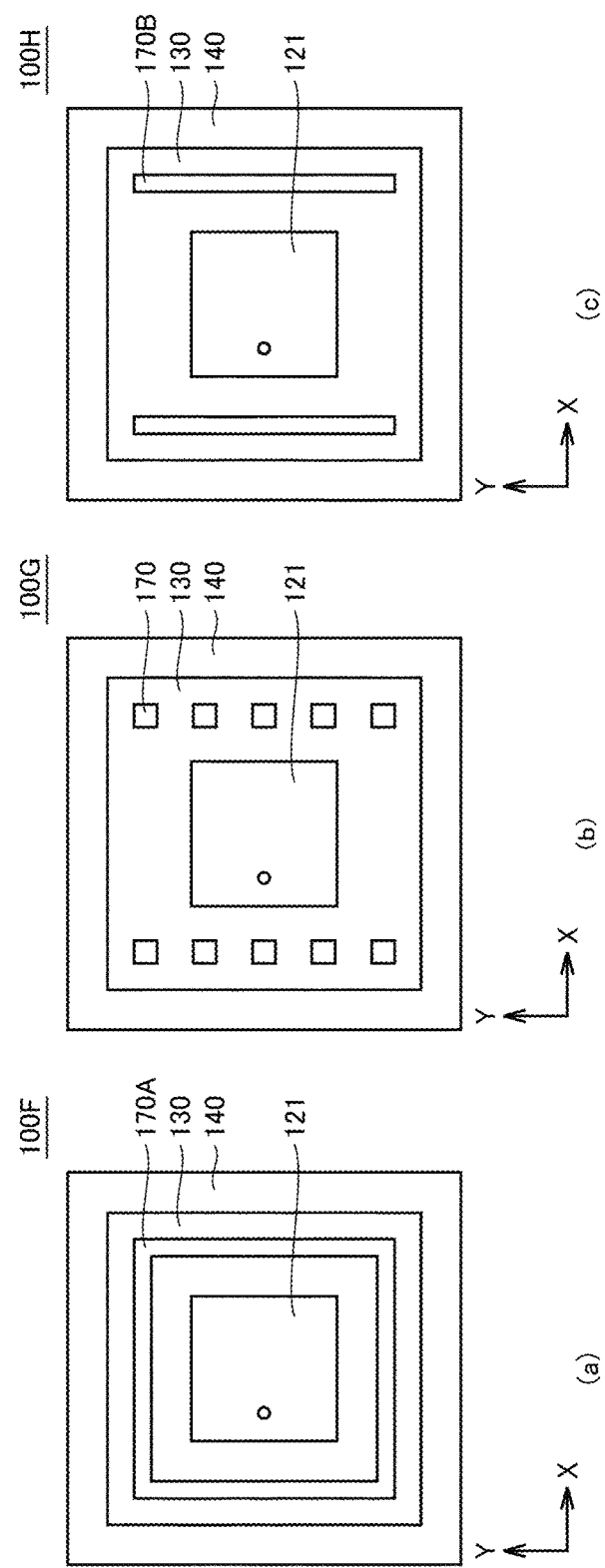
FIG. 13 includes diagrams for describing modified examples of arrangement of conductive members.
Figure 14:
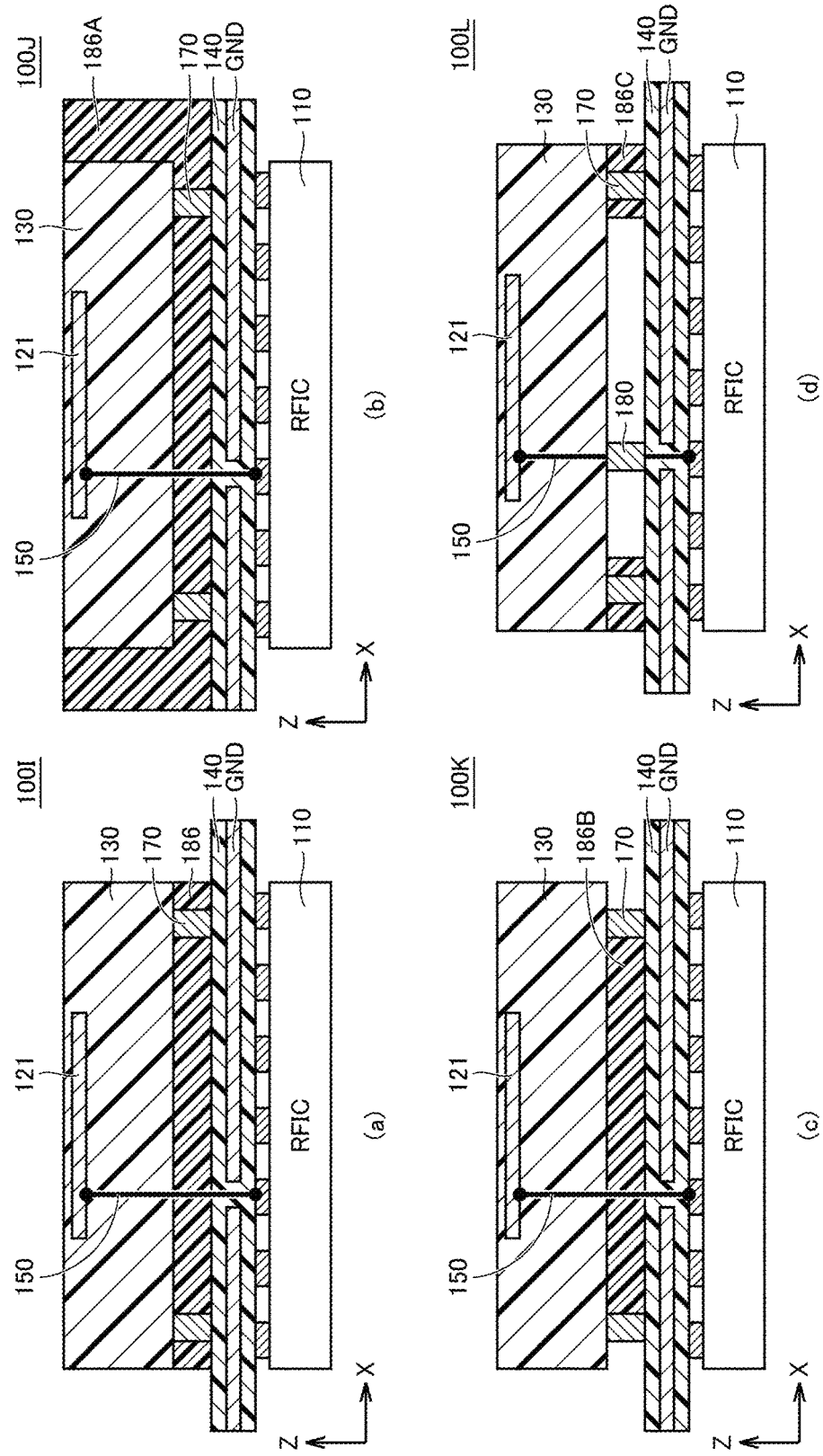
FIG. 14 includes diagrams for describing modified examples of a low-dielectric-constant layer.

Referring to FIGS. 13 and 14, modified examples of arrangement of the conductive members and substitute examples of the air layer will be described.

In the antenna modules according to the embodiments described above, the configuration in which multiple rectangular conductive members are disposed so as to be spaced apart from each other along the sides of the substantially-square feed element is described. However, the shape and arrangement of the conductive members may be any as long as the electromagnetic field between the feed element and the ground electrode is blocked.

For example, as in a conductive member 170A in an antenna module 100F in FIG. 13(a), a conductive member may be formed in a straight continuous line shape along each side of the feed element 121. In the example of the conductive member 170A in the antenna module 100F, straight-line members disposed along the sides connect with each other, and are disposed so as to surround the feed element 121.

In the case of a rectangular feed element 121, an electric field occurs mainly from sides orthogonal to the polarization direction. Therefore, arrangement of conductive members at least along the sides orthogonal to the polarization direction is effective. Specifically, as in an antenna module 100G in FIG. 13(b), multiple conductive members 170 may be disposed along the sides in the Y-axis direction of the feed element 121. Alternatively, as in an antenna module 100H in FIG. 13(c), rectangular conductive members 170B may be disposed along the sides in the Y-axis direction of the feed element 121.

In the antenna modules according to the embodiments described above, a space (air layer 185) is formed between the dielectric substrate 130 and the dielectric substrate 140. Instead of the air layer 185, a low-dielectric-constant layer may be formed by using a material having a dielectric constant lower than that of the dielectric substrate 130.

Specifically, as in an antenna module 100I in FIG. 14(a), the space between the dielectric substrate 130 and the dielectric substrate 140 may be filled with a dielectric 186 having a dielectric constant lower than that of the dielectric substrate 130. Further, as in an antenna module 100J in FIG. 14(b), in addition to the space between the dielectric substrate 130 and the dielectric substrate 140, the side surfaces of the dielectric substrate 130 may be covered by a dielectric 186A.

For the low-dielectric-constant layer, the whole space is not necessarily filled with a dielectric. For example, as in an antenna module 100K in FIG. 14(c), a dielectric 186B may be disposed in the inner portion with respect to the conductive members 170 between the dielectric substrate 130 and the dielectric substrate 140, and a space may be formed in the outer portion with respect to the conductive members 170. Alternatively, as in an antenna module 100L in FIG. 14(d), a dielectric 186C may be disposed in a periphery portion including the conductive members 170 between the dielectric substrate 130 and the dielectric substrate 140, and a space is formed in the inner portion with respect to the dielectric 186C. A dielectric may be formed partially in the thickness direction (Z-axis direction) between the dielectric substrate 130 and the dielectric substrate 140, which is not illustrated.

Seventh Embodiment

In the embodiments described above, single-polarization antenna modules, whose polarization direction of radio waves emitted from the radiating element is a single direction, are described. The features of the present disclosure may be applied also to a dual-polarization antenna module in which emission from the radiating element is performed in two different polarization directions.

Figure 15:
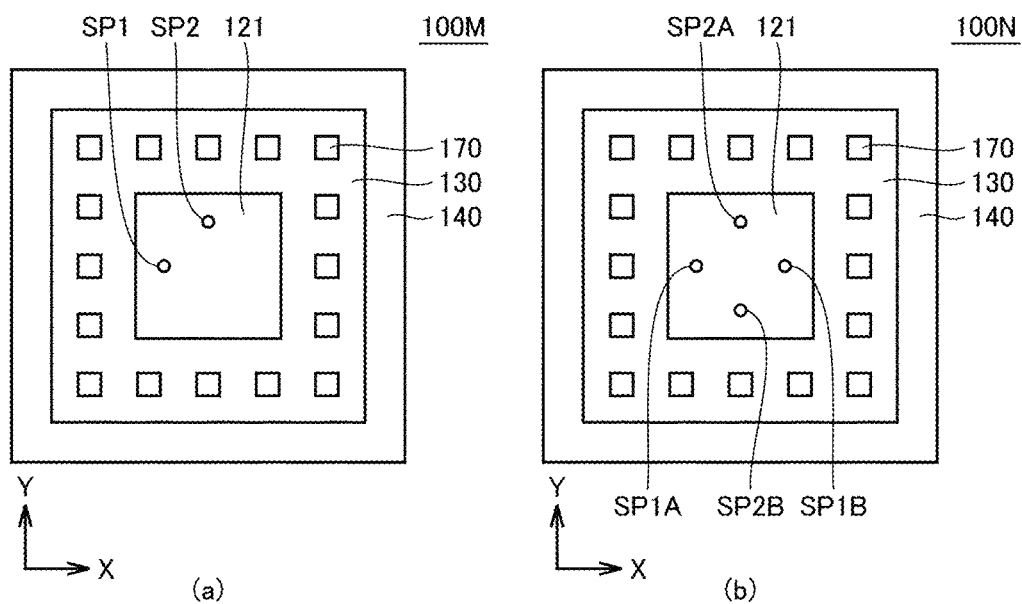
FIG. 15 includes plan views of dual-polarization antenna modules according to a seventh embodiment.

Specifically, an antenna module 100M in FIG. 15(a) has the feeding point SP1, which is disposed in the X-axis negative direction from the center of the feed element 121, and a feeding point SP2, which is disposed in the Y-axis positive direction from the center of the feed element 121. The feeding point SP1 and the feeding point SP2 are supplied with radio frequency signals. In this configuration, a low-dielectric-constant layer may be formed between the dielectric substrate 130 and the dielectric substrate 140, and the conductive members 170 may be disposed in the low-dielectric-constant layer. In this case, since radio waves are emitted in the X-axis direction and the Y-axis direction, the conductive members 170 are disposed along the sides of the feed element 121.

As in an antenna module 100N in FIG. 15(b), multiple feeding points may be formed for the respective polarization directions. Specifically, for radio waves whose polarization direction is the X-axis direction, a feeding point SP1A, which is disposed in the X-axis negative direction from the center of the feed element 121, and a feeding point SP1B, which is disposed in the X-axis positive direction, are supplied with radio frequency signals. For radio waves whose polarization direction is the Y-axis direction, a feeding point SP2A, which is disposed in the Y-axis positive direction from the center of the feed element 121, and a feeding point SP2B, which is disposed in the Y-axis negative direction, are supplied with radio frequency signals.

When a radio frequency signal is to be supplied to two feeding points having the same polarization direction, it is necessary to supply the feeding points with radio frequency signals whose phases are opposite to each other. Therefore, a phase adjusting circuit as described in the fifth embodiment is formed on each feed wiring line, which is not illustrated in FIG. 15(b). As described in the fifth embodiment, the phase adjusting circuit is preferably formed in the dielectric substrate 140 which is farther from the feed element 121, and the dielectric constant of the dielectric substrate 140 is preferably larger than that of the dielectric substrate 130.

<Array Antenna>

Eighth Embodiment

In an eighth embodiment, the case of an array antenna module in which multiple radiating elements are disposed in an array will be described.

First Example

Figure 16:
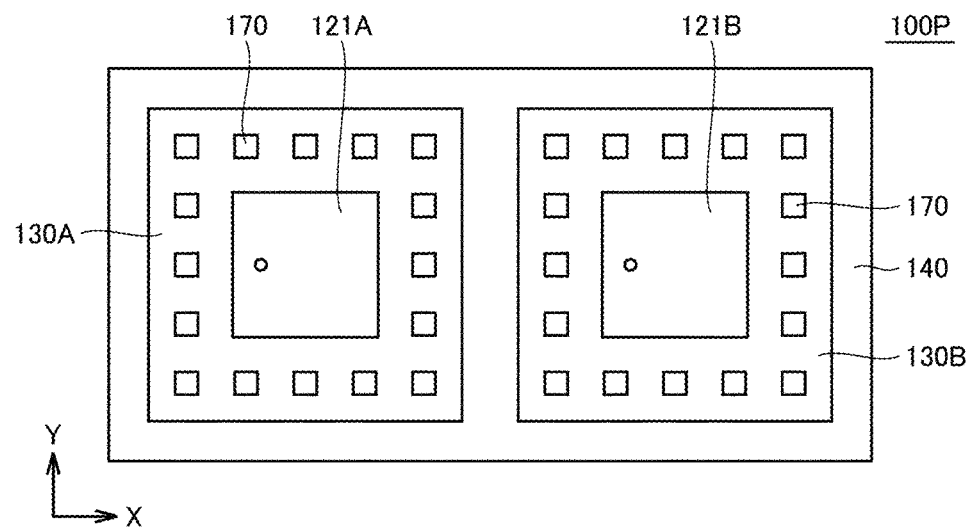
FIG. 16 is a plan view of a first array antenna module example according to an eighth embodiment.

FIG. 16 is a plan view of a first array antenna module example according to the eighth embodiment. In an antenna module 100P in FIG. 16, two dielectric substrates 130A and 130B are disposed adjacent to each other in the X-axis direction on the common dielectric substrate 140. Feed elements 121A and 121B are formed in or on the dielectric substrates 130A and 130B, respectively. In the low-dielectric-constant layer (air layer) between the dielectric substrates 130A and 130B and the dielectric substrate 140, the multiple conductive members 170 are disposed along the sides of the feed element 121A and the feed element 121B.

The configuration described above achieves both return loss reduction in a wide bandwidth and a wide directivity also in the array antenna module.

The "dielectric substrate 130A" and the "dielectric substrate 130B" in the first example correspond to the "first substrate" and a "second substrate", respectively, in the present disclosure. The "feed element 121A" and the "feed element 121B" in the first example correspond to the "first radiating element" and a "third radiating element", respectively, in the present disclosure.

Second Example

Figure 17:
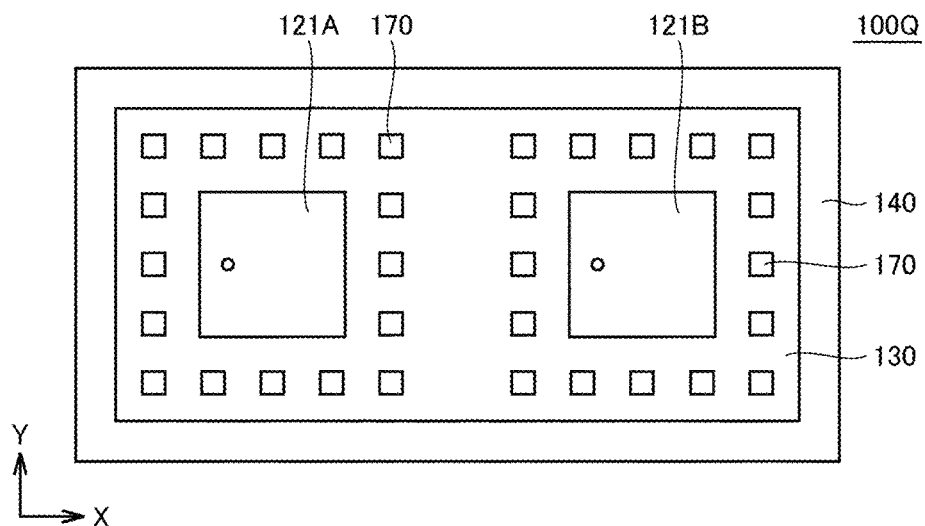
FIG. 17 is a plan view of a second array antenna module example according to the eighth embodiment.

FIG. 17 is a plan view of a second array antenna module example according to the eighth embodiment. In an antenna module 100Q in FIG. 17, the feed elements 121A and 121B are disposed in the X-axis direction on the common dielectric substrate 130, and the dielectric substrate 130 is disposed on the dielectric substrate 140. In the low-dielectric-constant layer (air layer) between the dielectric substrate 130 and the dielectric substrate 140, the multiple conductive members 170 are disposed along the sides of the feed element 121A and the feed element 121B. In the antenna module 100Q, the individual feed elements are surrounded by the multiple conductive members.

The array antenna module described above also achieves return loss reduction in a wide bandwidth and a wide directivity.

Figure 18:
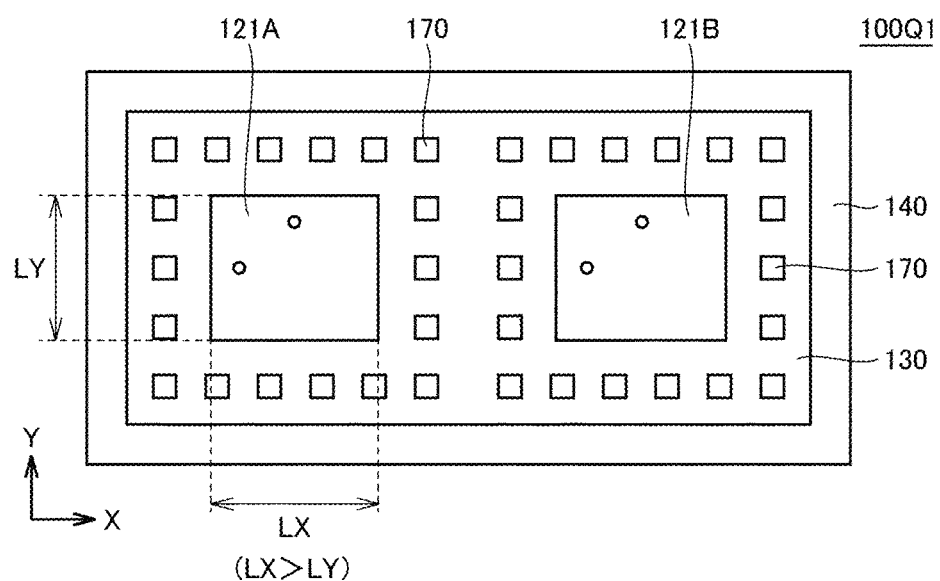
FIG. 18 is a plan view of a first modified example of the second antenna module example.

In the case of an antenna module, in which, as in the second example, feed elements are disposed in or on a common dielectric substrate and which is capable of emitting radio waves in both the polarization directions of the X-axis direction and the Y-axis direction, the lengths of the sides of each feed element are desirably changed in accordance with the lengths of the sides of the common dielectric substrate to reduce the difference between the radiation characteristics of the X-axis polarization and those of the Y-axis polarization. More specifically, as illustrated in an antenna module 100Q1 in FIG. 18, when the dielectric substrate 130 has a rectangular shape having long sides in the X-axis direction, the feed elements 121A and 121B desirably have a narrow space between the feed elements with the dimension LX in the X-axis direction being larger than the dimension LY in the Y-axis direction (LX>LY).

Compared with the antenna module 100P of the first example, the configuration having a common dielectric substrate corresponds to the configuration in which a dielectric is added in the space between the two dielectric substrates 130A and 130B. This may cause a change of the effective dielectric constant in the direction in which the two feed elements are adjacent to each other (that is, the X-axis direction), and may cause a change of the impedance for the polarization in the X-axis direction of each feed element. Then, the radiation characteristics of radio waves whose polarization direction is the X-axis direction may be different from the radiation characteristics of radio waves whose polarization direction is the Y-axis direction.

In this case, as in the antenna module 100Q1, the dimension in the X-axis direction of each of the feed elements 121A and 121B is made larger than the dimension in the Y-axis direction. This enables the impedance for the polarization in the X-axis direction to be adjusted, enabling reduction of the difference between the radiation characteristics of radio waves whose polarization direction is the X-axis direction and the radiation characteristics of radio waves whose polarization direction is the Y-axis direction.

Instead of changing the dimensions of each feed element, the shape of the conductive members 170 disposed around the feed elements may be changed to reduce the difference between the radiation characteristics of radio waves whose polarization direction is the X-axis direction and the radiation characteristics of radio waves whose polarization direction is the Y-axis direction.

Figure 19:
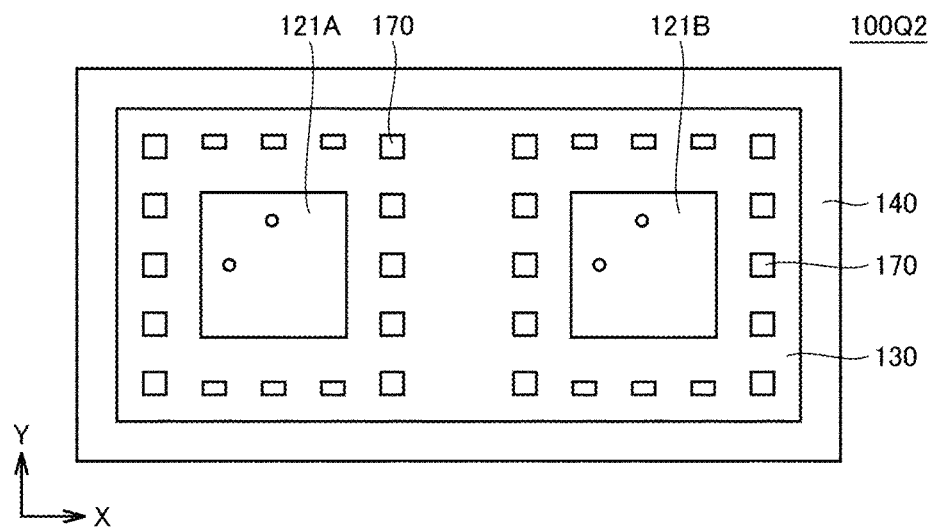
FIG. 19 is a plan view of a second modified example of the second antenna module example.

Specifically, as illustrated by an antenna module 100Q2 in FIG. 19, when viewed in plan in the direction normal to the dielectric substrate 130, the conductive members 170, which are disposed opposite the sides in the X-axis direction of the feed elements 121A and 121B, are made smaller than the conductive members 170, which are disposed opposite the sides in the Y-axis direction of the feed elements 121A and 121B. Therefore, coupling in the Y-axis direction between a radiating element and conductive members is smaller than coupling in the X-axis direction between a radiating element and conductive members, causing an increase of the impedance in the Y-axis direction. Thus, against a change of the impedance in the X-axis direction due to a common dielectric substrate, coupling with conductive members may be changed to adjust the impedance in the Y-axis direction, enabling reduction of the difference in impedance between the two polarization directions. Therefore, the difference in the radiation characteristics of radio waves between the two polarization directions may be reduced.

Third Example

Figure 20:
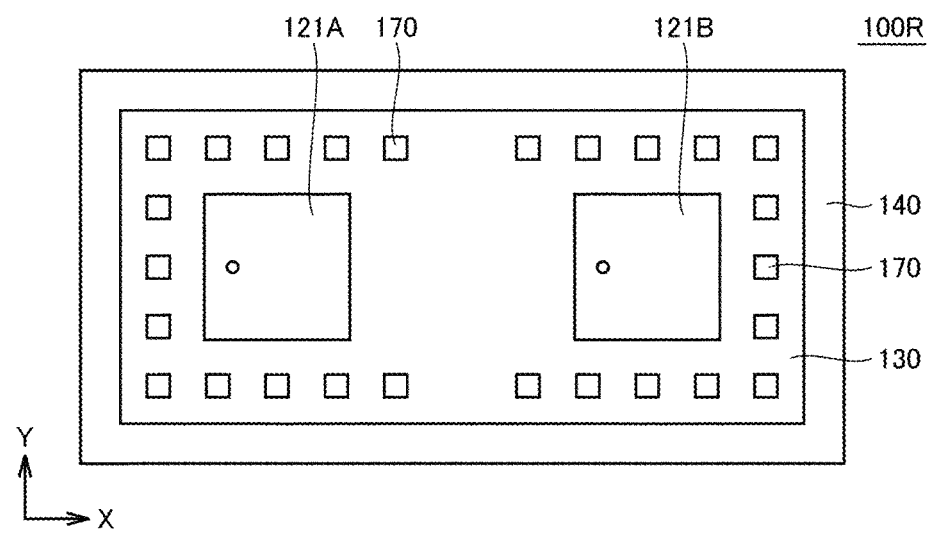
FIG. 20 is a plan view of a third array antenna module example according to the eighth embodiment.

FIG. 20 is a plan view of a third array antenna module example according to the eighth embodiment. An antenna module 100R in FIG. 20 has a configuration in which the conductive members 170 between the feed element 121A and the feed element 121B are removed from the configuration of the antenna module 100Q of the third example in FIG. 17.

The array antenna modules having the configuration described above also achieve return loss reduction in a wide bandwidth and a wide directivity.

In the second example and the third example, the "feed element 121A" and the "feed element 121B" correspond to the "first radiating element" and a "fourth radiating element", respectively, in the present disclosure.

Fourth Example

Figure 21:
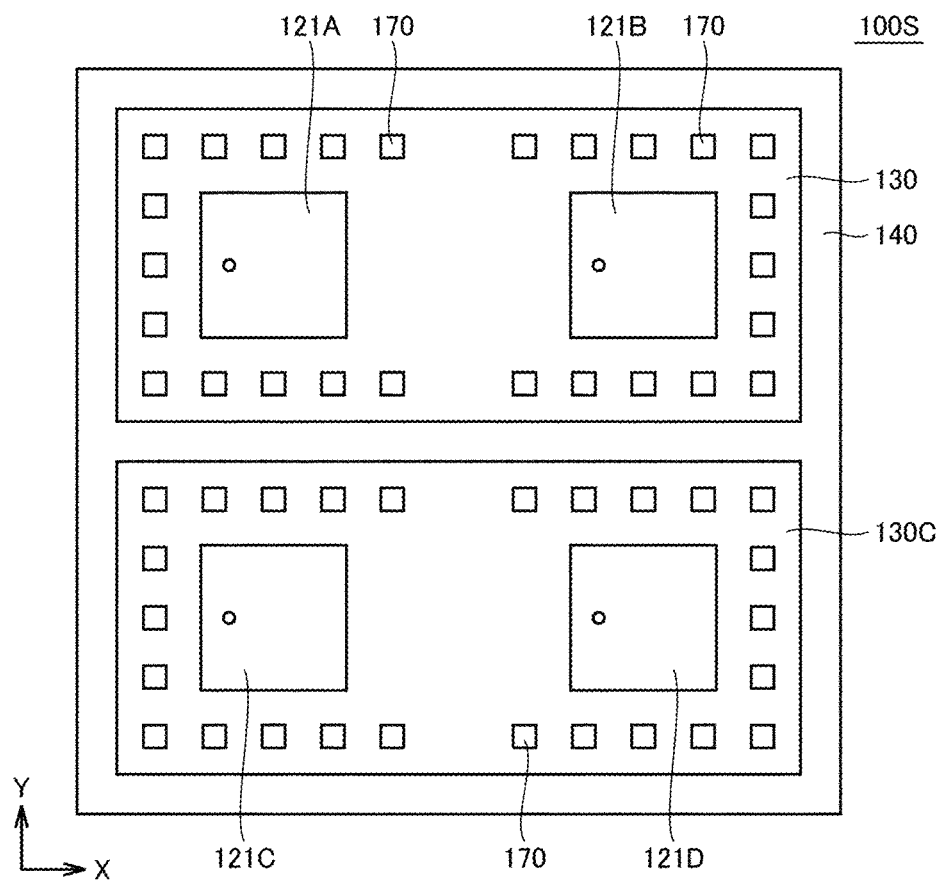
FIG. 21 is a plan view of a fourth array antenna module example according to the eighth embodiment.

FIG. 21 is a plan view of a fourth array antenna module example according to the eighth embodiment. An antenna module 100S in FIG. 21 has a configuration in which two configurations, in each of which, as illustrated in FIG. 20, multiple feed elements are disposed on a common dielectric substrate, are disposed on the common dielectric substrate 140. That is, the antenna module 100S is a 2×2 array antenna.

More specifically, in the antenna module 100S, rectangular dielectric substrates 130 and 130C are disposed adjacent to each other in the Y-axis direction on the common dielectric substrate 140. In or on the dielectric substrate 130, the feed elements 121A and 121B are disposed adjacent to each other in the X-axis direction. In or on the dielectric substrate 130C, feed elements 121C and 121D are disposed adjacent to each other in the X-axis direction. In the low-dielectric-constant layer (air layer) between the dielectric substrate 130, 130C and the dielectric substrate 140, the multiple conductive members 170 are disposed around each feed element. The conductive members 170 between the feed element 121A and the feed element 121B and the conductive members 170 between the feed element 121C and the feed element 121D are removed.

The array antenna modules having the configurations described above also achieve return loss reduction in a wide bandwidth and a wide directivity.

In the examples described above, the case in which the features of the present disclosure are applied to a 1×2 or 2×2 array antenna is described. The features of the present disclosure may be applied to an array antenna having more feed elements.

<Stacked Antenna>

The antenna modules described in the first to seventh embodiments have a single radiating element. In ninth to twelfth embodiments described below, configurations in which the features of the present disclosure are applied to stacked antenna modules will be described.

Ninth Embodiment

FIG. 22 is a cross-sectional view of an antenna module 100T according to the ninth embodiment. The antenna module 100T includes the feed element 121 and a parasitic element 122 as radiating elements. The parasitic element 122 is formed on the dielectric substrate 130. The feed element 121 is disposed in the dielectric substrate 140 so as to be opposite the parasitic element 122. The size of the feed element 121 is substantially the same as that of the parasitic element 122, and the resonant frequency of the feed element 121 is substantially the same as that of the parasitic element 122.

In the dielectric substrate 140, ground electrodes GND1 and GND2 are disposed opposite the feed element 121. The ground electrodes GND1 and GND2 are disposed lower (in the Z-axis negative direction) than the feed element 121. The ground electrode GND1 is disposed in a layer between the feed element 121 and the ground electrode GND2. That is, the feed element 121 is disposed between the parasitic element 122 and the ground electrode GND1. The layer between the ground electrode GND1 and the ground electrode GND2 is used as a wiring layer. The feed wiring line 150 extends from the RFIC 110 through the ground electrode GND1 and the ground electrode GND2, and is connected to the feed element 121.

The air layer 185 is formed between the dielectric substrate 130 and the dielectric substrate 140. In the air layer 185, electronic components 176 are disposed as conductive members. When viewed in plan in the direction normal to the antenna module 100T, the electronic components 176 are disposed around the radiating elements (the feed element 121 and the parasitic element 122) so as to be spaced apart from the radiating elements. When the wavelength of emitted radio waves is λ, the electronic components 176 are disposed in such a manner that the distance between adjacent electronic components 176 is equal to or less than λ/4.

In the antenna module 100T, the parasitic element 122, whose resonant frequency is close to that of the feed element 121, is disposed in the radial direction of the feed element 121, achieving return loss in a wider frequency bandwidth. In addition, the air layer 185 (low-dielectric-constant layer) is formed between the dielectric substrates 130 and 140, achieving return loss in a further wider frequency bandwidth. The electronic components 176 (conductive members) are disposed in the air layer 185, achieving a wide directivity. The electronic components 176 typically have higher dimensional accuracy for the outer shape than solder. Therefore, use of the electronic components 176 as conductive members causes improvement of accuracy of the dimension in the height direction (the Z-axis direction) of the air layer 185.

In FIG. 22, the feed element 121 is disposed in the dielectric substrate 140, but may be disposed in the dielectric substrate 130.

The "parasitic element 122" and the "feed element 121" in the ninth embodiment correspond to the "first radiating element" and a "second radiating element", respectively, in the present disclosure.

Tenth Embodiment

In the tenth embodiment, a stacked dual-band antenna module will be described.

Figure 23:
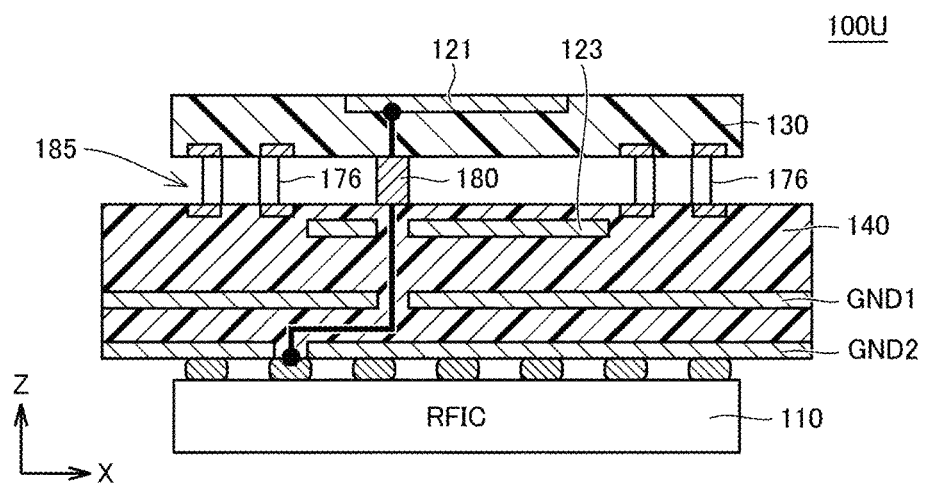
FIG. 23 is a cross-sectional view of an antenna module according to a tenth embodiment.

FIG. 23 is a cross-sectional view of an antenna module 100U according to the tenth embodiment. The antenna module 100U is different from the antenna module 100T according to the ninth embodiment in arrangement of the radiating elements. The configuration of the antenna module 100U, which is the same as that of the antenna module 100T, will not be described.

Referring to FIG. 23, the antenna module 100U includes the feed element 121, which is disposed in the dielectric substrate 130, and a parasitic element 123, which is disposed in the dielectric substrate 140, as radiating elements. The feed element 121 and the parasitic element 123 are disposed opposite each other. The parasitic element 123 is disposed between the feed element 121 and the ground electrode GND1. The size of the parasitic element 123 is larger than that of the feed element 121. That is, the resonant frequency of the feed element 121 is higher than that of the parasitic element 123.

The feed wiring line 150 extends from the RFIC 110 through the ground electrodes GND1 and GND2 and the parasitic element 123, and is connected to the feed element 121 through the conductive member 180 disposed in the air layer 185 between the dielectric substrate 130 and the dielectric substrate 140. A radio frequency signal corresponding to the resonant frequency of the feed element 121 is supplied from the RFIC 110 to the feed wiring line 150. Thus, radio waves are emitted from the feed element 121. When a radio frequency signal corresponding to the resonant frequency of the parasitic element 123 is supplied to the feed wiring line 150, electromagnetic field coupling occurs between the feed wiring line 150 and the parasitic element 123, and radio waves are emitted from the parasitic element 123. That is, the antenna module 100U functions as a dual-band antenna module.

In the antenna module having such a configuration, the air layer 185 is formed between the feed element 121 and the parasitic element 123. Therefore, especially for radio waves emitted from the feed element 121, return loss reduction in a wide bandwidth and a wide directivity may be achieved.

Also in the antenna module 100U, the parasitic element 123 may be disposed in the dielectric substrate 130. In this case, the air layer 185 is formed between the parasitic element 123 and the ground electrode GND1. Thus, especially for radio waves emitted from the parasitic element 123, return loss reduction in a wide bandwidth and a wide directivity may be achieved.

The "feed element 121" and the "parasitic element 123" in the tenth embodiment correspond to the "first radiating element" and the "second radiating element", respectively, in the present disclosure.

Eleventh Embodiment

In the eleventh embodiment, a configuration in which via electrodes coupled to conductive members are formed in the two dielectric substrates will be described.

Figure 24:
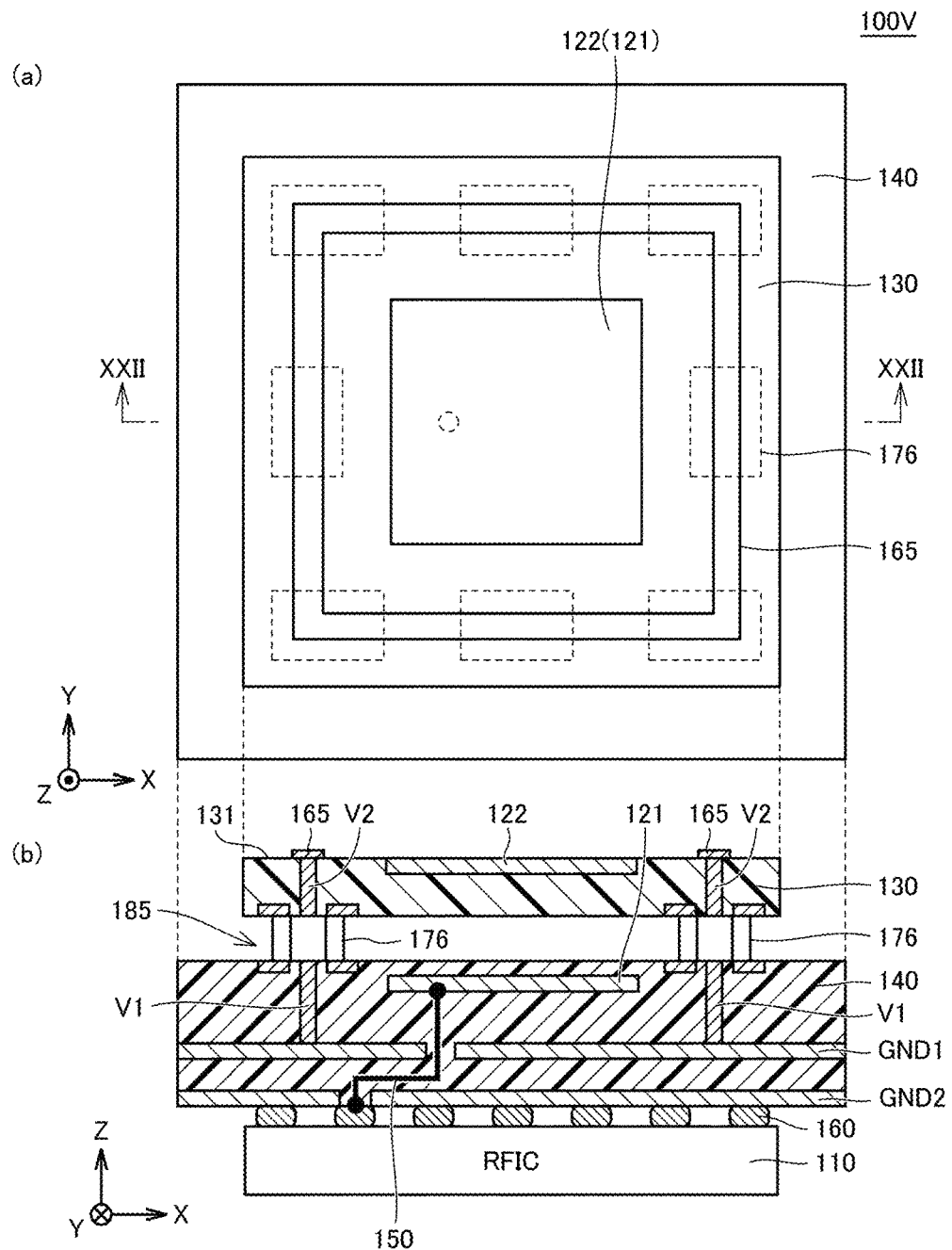
FIG. 24 includes a plan view and a cross-sectional view of an antenna module according to an eleventh embodiment.

FIG. 24 is a diagram for describing an antenna module 100V according to the eleventh embodiment. FIG. 24(a) in the upper row is a plan view of the antenna module 100V. FIG. 24(b) in the lower row is a cross-sectional view along line XXII-XXII in FIG. 24(a).

Referring to FIG. 24, the antenna module 100V includes, in addition to the configuration of the antenna module 100T described in the ninth embodiment, via electrodes V2 formed in the dielectric substrate 130, a connection conductor 165 which connects the via electrodes V2 to each other, and via electrodes formed in the dielectric substrate 140. The same components, in FIG. 24, as those in FIG. 22 will not be described.

Via electrodes V1 connect the electronic components 176 to the ground electrode GND1 in the dielectric substrate 140. The via electrodes V2 extend through the dielectric substrate 130, and have first ends connected to the electronic components 176. The second ends of the via electrodes V2 connect with the connection conductor 165 disposed on the front face 131 of the dielectric substrate 130. When the antenna module 100V is viewed in plan, the connection conductor 165 is disposed so as to surround the parasitic element 122 (and the feed element 121), and connect the via electrodes V2 to each other.

The via electrodes and the connection conductor cause the area, in which the electromagnetic field which occurs from the radiating elements is blocked, to be made large, achieving suppression of the peak gain and acquisition of a wide directivity. The via electrodes connected to the ground electrode enable reduction of influence of an outside electromagnetic field.

The "via electrode V2" in the eleventh embodiment corresponds to a "second via electrode" in the present disclosure.

Twelfth Embodiment

Figure 25:
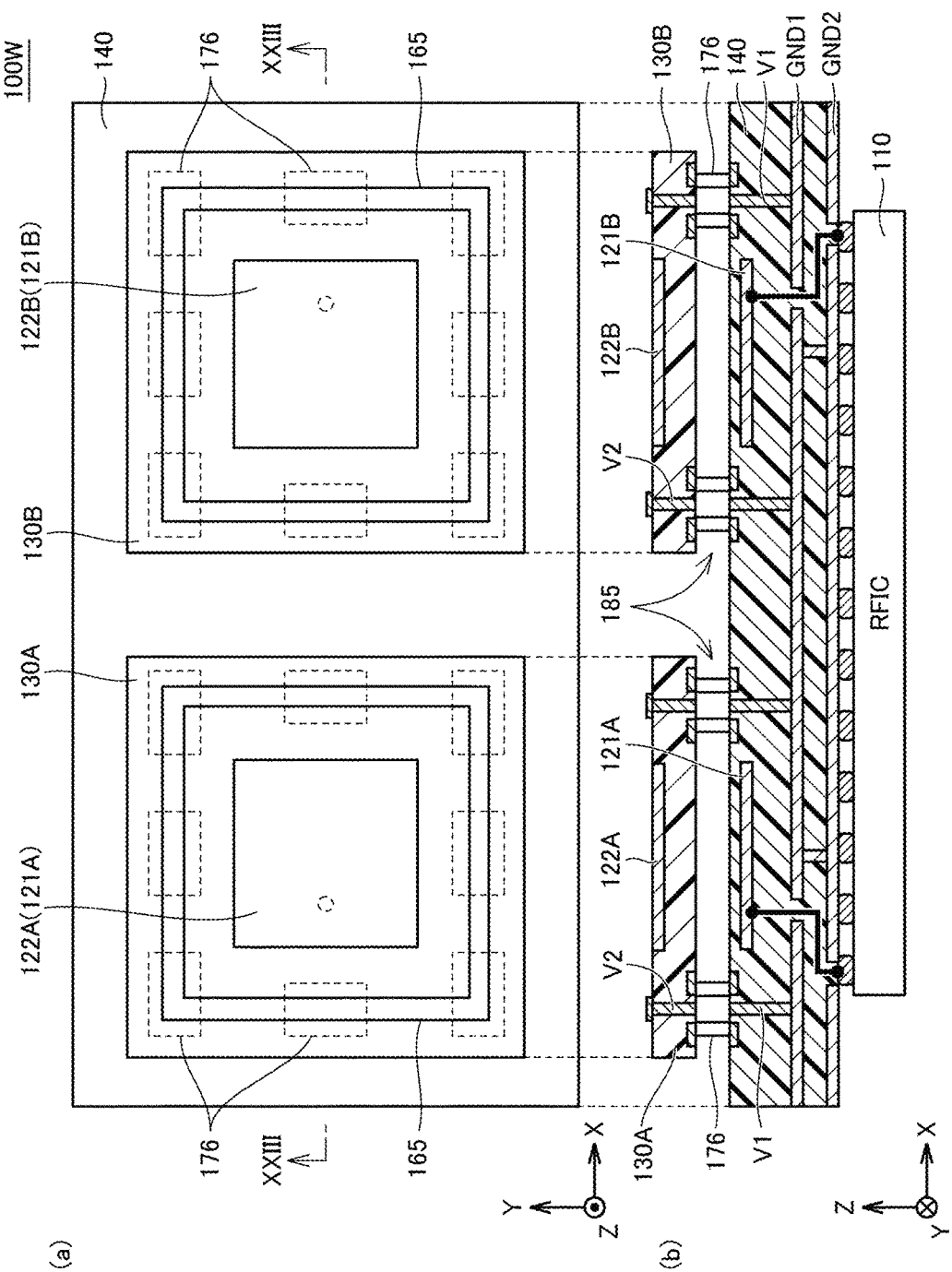
FIG. 25 includes a plan view and a cross-sectional view of an array antenna module according to a twelfth embodiment.

In the twelfth embodiment, a configuration in which an array antenna module is obtained by using the antenna module 100V according to the eleventh embodiment will be described. FIG. 25 illustrates a plan view (FIG. 25(*a*)) of an antenna module 100W according to the twelfth embodiment, and a cross-sectional view (FIG. 25(*b*)) along line XXIII-XXIII in the plan view.

Referring to FIG. 25, like the antenna module 100P according to the eighth embodiment which is illustrated in FIG. 16, the antenna module 100W has a configuration in which the two dielectric substrates 130A and 130B are disposed adjacent to each other in the X-axis direction on the common dielectric substrate 140. A parasitic element 122A is disposed on the dielectric substrate 130A, and a parasitic element 122B is disposed on the dielectric substrate 130B. In the dielectric substrate 140, the feed element 121A is disposed opposite the parasitic element 122A, and the feed element 121B is disposed opposite the parasitic element 122B.

The air layers 185 are formed between the dielectric substrate 130A and the dielectric substrate 140 and between the dielectric substrate 130B and the dielectric substrate 140. Like the antenna module 100V, the antenna module 100W includes the multiple electronic components 176 disposed in the air layers 185 so as to surround the radiating elements when the antenna module 100W is viewed in plan. The via electrodes V1 connect the electronic components 176 to the ground electrode GND1 disposed in the dielectric substrate 140. In addition, the via electrodes V2, which are formed in the dielectric substrates 130A and 130B, connect the electronic components 176 to the connection conductors 165 formed on the front faces of the dielectric substrates 130A and 130B.

Also in such an array antenna, the electronic components, the via electrodes, and the connection conductors cause the area, in which electromagnetic fields which occur from the radiating elements are blocked, to be made large, achieving suppression of the peak gain and acquisition of a wide directivity. In addition, the via electrodes connecting with the ground electrodes enable isolation between the adjacent radiating elements to be improved. In addition, a space formed between the two dielectric substrates 130A and 130B adjacent to each other causes the configuration in which the dielectric substrate 130A does not abut the dielectric substrate 130B, achieving suppression of variation of the beam of radio waves emitted from each substrate.

Thirteenth Embodiment

In a thirteenth embodiment, a configuration in which an antenna module is reduced in size by disposing a radiating element obliquely with respect to a dielectric substrate will be described.

Figure 26:
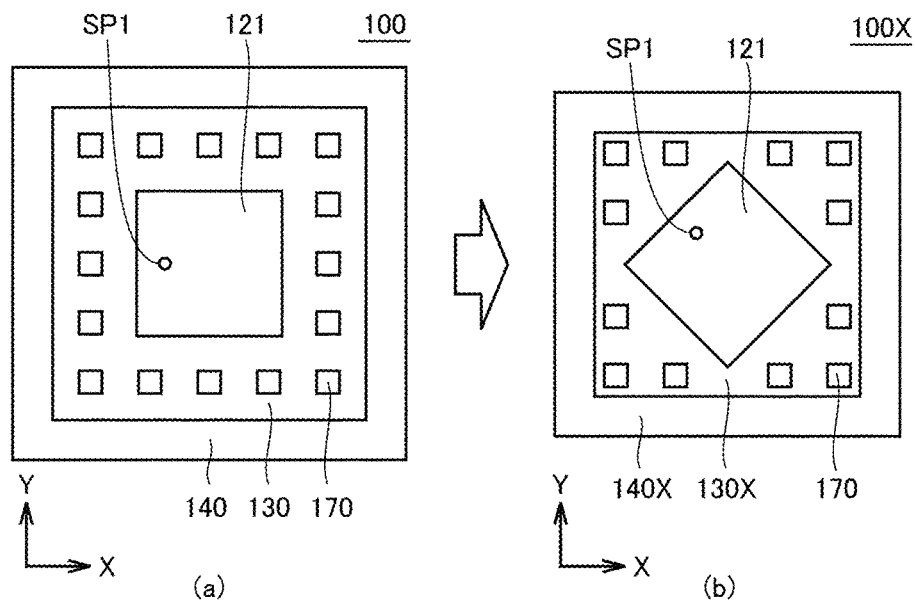
FIG. 26 includes plan views for describing a first antenna module example according to a thirteenth embodiment.

FIG. 26 includes plan views for describing an antenna module 100X according to a first example of the thirteenth embodiment. In FIG. 26, the diagram on the left (FIG. 26(*a*)) illustrates the antenna module 100 according to the first embodiment for comparison, and the diagram on the right (FIG. 26(*b*)) illustrates the antenna module 100X according to the thirteenth embodiment.

Referring to FIG. 26, the antenna module 100X includes the feed element 121 disposed obliquely so that the sides of the feed element 121 are disposed at an angle of 45° with respect to the respective sides of dielectric substrates 130X and 140X. In the antenna module 100 and the antenna module 100X, the feed element 121 has the same size, but the sizes of dielectric substrates 130X and 140X are smaller than those of the dielectric substrates 130 and 140, respectively, of the antenna module 100. Accordingly, the number of conductive members 170 disposed around the feed element 121 is decreased.

In the antenna module 100X, even when the dielectric substrates are made smaller than those of the antenna module 100, the distance, in the polarization direction, from the end portion of the feed element 121 to the end portion of the dielectric substrate 130X may be secured as much as that in the antenna module 100. Therefore, occurrence of the state in which reduction of the dielectric substrate in size causes a narrow frequency bandwidth may be suppressed.

Thus, the antenna module having the configuration in which the radiating element is disposed obliquely with respect to the dielectric substrates also achieves a wide directivity by disposing conductive members around the feed element, and further achieves reduction of the antenna module in size.

Figure 27:
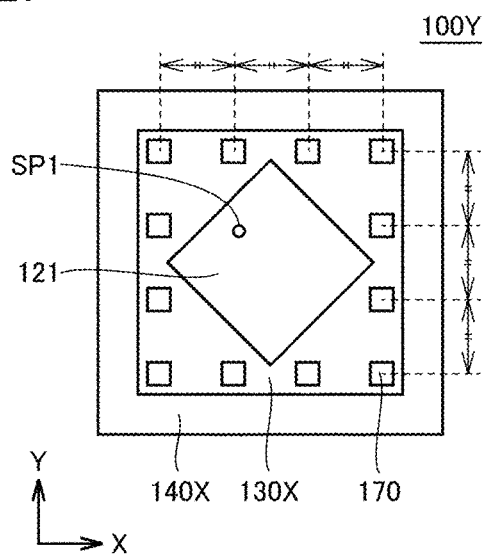
FIG. 27 is a plan view of a second antenna module example according to the thirteenth embodiment.

In the antenna module 100X, the intervals between the conductive members 170 disposed around the feed element 121 are not uniform. As in an antenna module 100Y of a second example illustrated in FIG. 27, the intervals between the conductive members 170 disposed along the sides of the dielectric substrate 130X may be equal to each other. The tilt angle of the feed element 121 is not necessarily limited to 45°. As long as a certain distance, in the polarization direction, from the end portion of the feed element 121 to the end portion of the dielectric substrate 130X is obtained, the tilt angle may be other than an angle of 45°.

The embodiments disclosed in the specification are to be considered to be illustrative in all respects and not to be limiting. The scope of the present invention is indicated not by the description about the embodiments above, but by the claims. The scope of the present invention is intended to encompass all changes within the meaning and scope of the claims and equivalents.

REFERENCE SIGNS LIST 10 communication device
100, 100A to 100N, 100P to 100Y, 100Q1, 100Q2, 100 #1, 100 #2 antenna module
110 RFIC
111A to 111D, 113A to 113D, 117 switch
112AR to 112DR low-noise amplifier
112AT to 112DT power amplifier
114A to 114D attenuator 115A to 115D phase shifter
116 signal combiner/splitter
118 mixer
119 amplifying circuit
121, 121A to 121D feed element
120 antenna device
122, 122A, 122B, 123 parasitic element
130, 130A to 130C, 130X, 140, 140X dielectric substrate
150 feed wiring line
155 phase adjusting circuit
160 solder bump
165 connection conductor
170, 170A, 170B, 180 conductive member
175 electrode connecting material component
176 electronic component
177 connection line
185 air layer
186, 186A to 186C dielectric
190, 195 electrode pad
196 resist
197, V1, V2 via electrode
200 BBIC
GND, GND1, GND2 ground electrode
SPLA, SP1B, SP1, SP2, SP2A, SP2B feeding point

The invention claimed is:

1. An antenna module comprising:
a first radiating element;
a ground electrode;
a first dielectric substrate in or on which the first radiating element is disposed;
a second dielectric substrate disposed opposite the first dielectric substrate, the ground electrode being disposed in the second dielectric substrate;
a conductive member that is disposed around the first radiating element when viewed in plan in a direction normal to the first radiating element,
wherein a space between the first dielectric substrate and the second dielectric substrate includes an air layer, and the conductive member is disposed in the air layer,
wherein a distance, in a normal direction in the first dielectric substrate, from the first radiating element to the conductive member is shorter than a distance, in a normal direction in the second dielectric substrate, from the ground electrode to the conductive member.

2. The antenna module according to claim 1, further comprising:
a first via electrode disposed in the second dielectric substrate, and connected at a first end thereof to the conductive member, but open at a second end thereof.

3. The antenna module according to claim 2, further comprising:
a second via electrode that is connected to the conductive member and extends through the first dielectric substrate.

4. The antenna module according to claim 1,
wherein the conductive member comprises a first conductive member and a second conductive member, and
the antenna module further comprises a connection line that connects the first conductive member to the second conductive member in the second dielectric substrate.

5. The antenna module according to claim 4,
wherein the connection line has such a length that a resonant frequency of the first conductive member and the second conductive member that are connected by the connection line is twice as high as a resonant frequency of the first radiating element.

6. The antenna module according to claim 1;
wherein the conductive member includes an electronic component or an electrode connecting material component.

7. The antenna module according to claim 1, further comprising:
a second radiating element that disposed in the first dielectric substrate or the second dielectric substrate, and positioned between the first radiating element and the ground electrode.

8. The antenna module according to claim 7,
wherein the first radiating element is a parasitic element, and
the second radiating element is a feed element.

9. The antenna module according to claim 7,
wherein the first radiating element is a feed element,
the second radiating element is a parasitic element,
a resonant frequency of the first radiating element is higher in frequency than a resonant frequency of the second radiating element, and
the antenna module further comprises a feed wiring line which extends through the second radiating element and via which a radio frequency signal is conveyed to the first radiating element.

10. The antenna module according to claim 7, further comprising:
a feed circuit configured to supply a radio frequency signal to of the first radiating element and the second radiating element.

11. The antenna module according to claim 1,
wherein the first dielectric substrate comprises a first substrate and a second substrate which are disposed adjacent to each other,
the first radiating element is disposed in or on the first substrate,
the antenna module further comprises a third radiating element disposed in or on the second substrate, and
the conductive member is also disposed around the third radiating element.

12. The antenna module according to claim 1,
wherein the first dielectric substrate further includes a fourth radiating element disposed adjacent to the first radiating element, and
the conductive member is also disposed around the fourth radiating element.

13. The antenna module according to claim 12,
wherein the first dielectric substrate has a rectangular shape with longest sides thereof that extend in an adjacent direction in which the first radiating element is adjacent to the fourth radiating element,
each of the first radiating element and the fourth radiating element is capable of emitting radio waves whose polarization direction is the adjacent direction, and is capable of emitting radio waves whose polarization direction is a direction orthogonal to the adjacent direction, and
each of the first radiating element and the fourth radiating element is formed in a rectangular shape with longest sides thereof that extend in the adjacent direction.

14. The antenna module according to claim 1, further comprising:
a feed wiring line through which a radio frequency signal is conveyed to the first radiating element; and
a phase adjusting circuit connected to the feed wiring line in the second dielectric substrate,
wherein the second dielectric substrate has a dielectric constant larger than a dielectric constant of the first dielectric substrate.

15. A communication device comprising the antenna module according to claim 1.

16. An antenna module comprising:
a first radiating element;
a ground electrode;
a first dielectric substrate in or on which the first radiating element is disposed;
a second dielectric substrate disposed opposite the first dielectric substrate, the ground electrode being disposed in the second dielectric substrate;
a conductive member that is disposed around the first radiating element when viewed in plan in a direction normal to the first radiating element,
wherein a space between the first dielectric substrate and the second dielectric substrate includes an air layer, and
the conductive member is disposed in the air layer,
wherein the first radiating element is a patch antenna having a rectangular planar shape, and
the conductive member is disposed along sides of the first radiating element that are orthogonal to a polarization direction of radio waves emitted from the first radiating element.

17. An antenna module comprising:
a first radiating element;
a ground electrode;
a first dielectric substrate in or on which the first radiating element is disposed;
a second dielectric substrate disposed opposite the first dielectric substrate, the ground electrode being disposed in the second dielectric substrate;
a conductive member that is disposed around the first radiating element when viewed in plan in a direction normal to the first radiating element,
wherein a space between the first dielectric substrate and the second dielectric substrate includes an air layer, and
the conductive member is disposed in the air layer,
wherein the conductive member is connected to the ground electrode.

\* \* \* \* \*